(12) United States Patent
Takahashi et al.

(10) Patent No.: US 8,842,223 B2
(45) Date of Patent: Sep. 23, 2014

(54) TRANSMITTER APPARATUS, INFORMATION PROCESSING METHOD, PROGRAM, AND TRANSMITTER SYSTEM

(75) Inventors: Hiroo Takahashi, Tokyo (JP); Lachlan Bruce Michael, Saitama (JP); Takashi Yokokawa, Kanagawa (JP); Naoki Yoshimochi, Kanagawa (JP); Takahiro Okada, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/000,711

(22) PCT Filed: Feb. 22, 2012

(86) PCT No.: PCT/JP2012/054308
§ 371 (c)(1),
(2), (4) Date: Aug. 21, 2013

(87) PCT Pub. No.: WO2012/117917
PCT Pub. Date: Sep. 7, 2012

(65) Prior Publication Data
US 2013/0321707 A1    Dec. 5, 2013

(30) Foreign Application Priority Data
Feb. 28, 2011 (JP) ................................ 2011-041804

(51) Int. Cl.
*H04N 5/38* (2006.01)
*H04H 20/77* (2008.01)

(52) U.S. Cl.
CPC *H04N 5/38* (2013.01); *H04H 20/77* (2013.01)
USPC ........... 348/723; 348/711; 348/718; 348/719; 348/724; 348/725; 348/729; 348/734; 348/608; 348/636; 348/680; 348/693; 348/500; 348/516; 348/571; 348/552; 348/409.1; 348/460; 348/474; 348/211.4; 348/211.5; 348/211.6; 348/211.99; 348/222.1; 348/289; 348/133; 348/140; 348/156; 348/192; 348/87; 348/25; 348/14.12; 375/258; 375/260; 375/295; 375/299; 375/316; 725/54; 725/67; 725/68; 725/90; 725/98; 725/112; 725/118; 725/117; 725/136; 725/148; 455/91; 455/69; 455/450

(58) Field of Classification Search
USPC ......... 348/723, 729, 680, 693, 636, 500, 711, 348/718, 719, 724, 725, 734, 608, 516, 571, 348/552, 409.1, 460, 474, 289, 211.4, 348/211.5, 211.6, 211.99, 222.1, 192, 156, 348/140, 133, 14.12, 25, 87; 375/258, 260, 375/295, 299, 316; 455/450, 69, 91; 725/118, 117, 148, 68, 67, 54, 90, 98, 725/112, 136
See application file for complete search history.

(56) References Cited

U.S. PATENT DOCUMENTS 5,786,917 A * 7/1998 Maeno ............................ 398/51
8,121,218 B2 * 2/2012 Kwon et al. ................. 375/299

(Continued)

FOREIGN PATENT DOCUMENTS

| JP | 11-66637 | 3/1999 |
|---|---|---|
| JP | 2000-261403 | 9/2000 |

(Continued)

OTHER PUBLICATIONS

International Search Report issued Mar. 19, 2012, in International application No. PCT/JP2012/054308.

*Primary Examiner* — Jefferey Harold
*Assistant Examiner* — Mustafizur Rahman
(74) *Attorney, Agent, or Firm* — Oblon, Spivak, McClelland, Maier & Neustadt, L.L.P.

(57) ABSTRACT

The present technology relates to a transmitter apparatus, an information processing method, a program, and a transmitter system capable of easily transmitting a wideband signal.
The transmitter apparatus includes: a first acquisition unit that obtains first transmission control information; a second acquisition unit that obtains second transmission control information similar to information input to another transmitter apparatus; and a generating unit that processes transmission target data based on a parameter contained in the first transmission control information and generates data including the processed transmission target data and the second transmission control information. The present technology can be applied to a transmitter apparatus that transmits a DVB-C2 signal.

19 Claims, 21 Drawing Sheets

(56) References Cited

U.S. PATENT DOCUMENTS

| | | | |
|---|---|---|---|
| 8,514,335 B2* | 8/2013 | Murakami et al. | 348/723 |
| 2006/0083211 A1* | 4/2006 | Laroia et al. | 370/343 |
| 2007/0109262 A1* | 5/2007 | Oshima et al. | 345/156 |
| 2007/0286129 A1* | 12/2007 | Atarashi et al. | 370/335 |
| 2008/0232504 A1* | 9/2008 | Ma et al. | 375/267 |
| 2009/0003486 A1* | 1/2009 | Kwon et al. | 375/299 |
| 2009/0110092 A1 | 4/2009 | Taylor et al. | |
| 2009/0207784 A1* | 8/2009 | Lee et al. | 370/328 |
| 2009/0304023 A1 | 12/2009 | Stadelmeier et al. | |
| 2010/0083333 A1* | 4/2010 | Mizosoe et al. | 725/118 |
| 2010/0135422 A1 | 6/2010 | Lee et al. | |
| 2010/0311429 A1* | 12/2010 | Baker et al. | 455/450 |
| 2010/0329339 A1* | 12/2010 | Kanagawa | 375/240.16 |
| 2010/0329364 A1* | 12/2010 | Giombanco et al. | 375/258 |
| 2011/0044393 A1* | 2/2011 | Ko et al. | 375/260 |

FOREIGN PATENT DOCUMENTS

| | | |
|---|---|---|
| JP | 2011-298437 | 10/2001 |
| JP | 2009-153109 | 7/2009 |
| JP | 2009-296586 | 12/2009 |
| WO | WO 2010/047513 A2 | 4/2010 |

* cited by examiner

FIG. 8

| | Field | Size(bits) |
|---|---|---|
| 1 | NETWORK_ID | 16 |
| 2 | C2_SYSTEM_ID | 16 |
| 3 | START_FREQUENCY | 24 |
| 4 | C2_BANDWIDTH | 16 |
| 5 | GUARD_INTERVAL | 2 |
| 6 | C2_FRAME_LENGTH | 10 |
| 7 | L1_PART2_CHANGE_COUNTER | 8 |
| 8 | NUM_DSLICE | 8 |
| 9 | NUM_NOTCH | 4 |
| 10 | for i=0..NUM_DSLICE-1 { | |
| 11 |     DSLICE_ID | 8 |
| 12 |     DSLICE_TUNE_POS | 14 or 13 |
| 13 |     DSLICE_OFFSET_LEFT | 9 or 8 |
| 14 |     DSLICE_OFFSET_RIGHT | 9 or 8 |
| 15 |     DSLICE_TI_DEPTH | 2 |
| 16 |     DSLICE_TYPE | 1 |
| 17 |     if DSLICE_TYPE=='1' { | |
| 18 |         FEC_HEADER_TYPE | 1 |
| 19 |     } | |
| 20 |     DSLICE_CONST_CONF | 1 |
| 21 |     DSLICE_LEFT_NOTCH | 1 |
| 22 |     DSLICE_NUM_PLP | 8 |
| 23 |     for i=0..DSLICE_NUM_PLP-1 { | |
| 24 |         PLP_ID | 8 |
| 25 |         PLP_BUNDLED | 1 |
| 26 |         PLP_TYPE | 2 |
| 27 |         PLP_PAYLOAD_TYPE | 5 |
| 28 |         if PLP_TYPE=='00' or '01' { | |
| 29 |             PLP_GROUP_ID | 8 |
| 30 |         } | |
| 31 |         if DSLICE_TYPE=='0' { | |
| 32 |             PLP_START | 14 |
| 33 |             PLP_FEC_TYPE | 1 |
| 34 |             PLP_MOD | 3 |
| 35 |             PLP_COD | 3 |
| 36 |         } | |
| 37 |         PSI/SI_REPROCESSING | 1 |
| 38 |         if PSI/SI_REPROCESSING=='0' { | |
| 39 |             transport_stream_id | 16 |
| 40 |             original_network_id | 16 |
| 41 |         } | |
| 42 |         RESERVED_1 | 8 |
| 43 |     } | |
| 44 |     RESERVED_2 | 8 |
| 45 | } | |
| 46 | for i=0..NUM_NOTCH-1 { | |
| 47 |     NOTCH_START | 14 or 13 |
| 48 |     NOTCH_WIDTH | 9 or 8 |
| 49 |     RESERVED_3 | 8 |
| 50 | } | |
| 51 | RESERVED_TONE | 1 |
| 52 | RESERVED_4 | 16 |

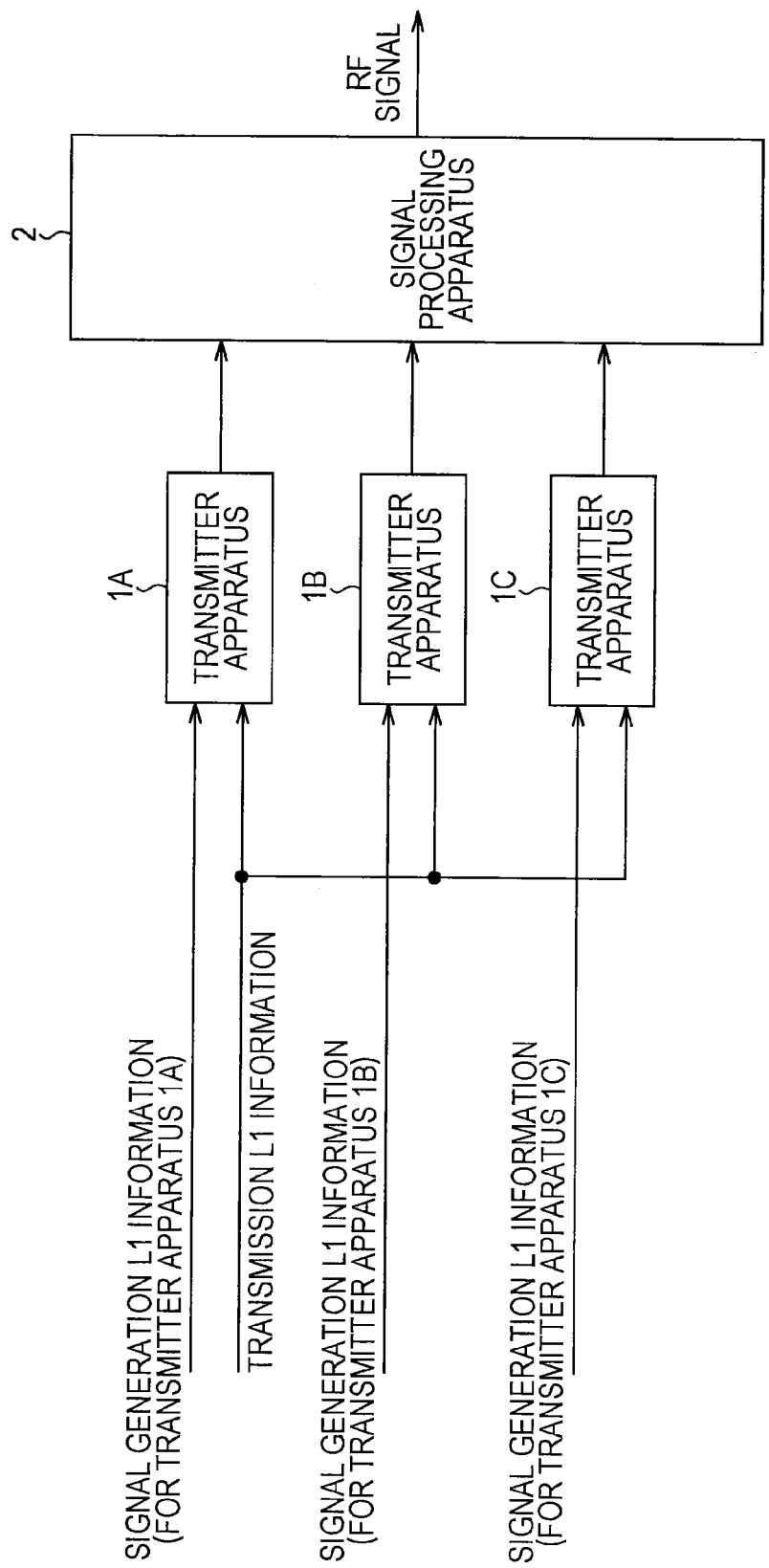

FIG. 17

| | | TRANSMISSION L1 INFORMATION | SIGNAL GENERATION L1 INFORMATION (FOR TRANSMITTER APPARATUS 1A) | SIGNAL GENERATION L1 INFORMATION (FOR TRANSMITTER APPARATUS 1B) |
|---|---|---|---|---|
| 1 | NETWORK_ID | 0 | 0 | 0 |
| 2 | C2_SYSTEM_ID | 0 | 0 | 0 |
| 3 | START_FREQUENCY | 0352E0h | 0352E0h | 0352E0h |
| 4 | C2_BANDWIDTH | 284d | 142d | 142d |
| 5 | GUARD_INTERVAL | 0 | 0 | 0 |
| 6 | C2_FRAME_LENGTH | 111000000 | 111000000 | 111000000 |
| 7 | L1_PART2_CHANGE_COUNTER | 0 | 0 | 0 |
| 8 | NUM_DSLICE | 2 | 1 | 1 |
| 9 | NUM_NOTCH | 1 | 0 | 1 |
| 10 | DSLICE_ID | 0<br>1 | 0 | 0 |
| 11 | DSLICE_TUNE_POS | 71d<br>213d | 71d | 213d |
| 12 | DSLICE_OFFSET_LEFT | -71d<br>-71d | -71d | -71d |
| 13 | DSLICE_OFFSET_RIGHT | 71d<br>71d | 71d | 71d |
| 14 | DSLICE_TI_DEPTH | 1<br>1 | 1 | 1 |
| 15 | DSLICE_TYPE | 1<br>1 | 1 | 1 |
| 16 | DSLICE_CONST_CONF | 1<br>1 | 1 | 1 |
| 17 | DSLICE_LEFT_NOTCH | 0<br>1 | 0 | 0 |
| 18 | DSLICE_NUM_PLP | 1<br>1 | 1 | 1 |
| 19 | PLP_ID | 0<br>0 | 0 | 0 |
| 20 | PLP_BUNDLED | 0<br>0 | 0 | 0 |
| 21 | PLP_TYPE | 10<br>10 | 10 | 10 |
| 22 | PLP_PAYLOAD_TYPE | 11<br>11 | 11 | 11 |
| 23 | PLP_START | 10<br>10 | 10 | 10 |
| 24 | PLP_FEC_TYPE | 1<br>1 | 1 | 1 |
| 25 | PLP_MOD | 11<br>11 | 11 | 11 |
| 26 | PLP_COD | 100<br>100 | 100 | 100 |
| 27 | PSI/SI_REPROCESSING | 1<br>1 | 1 | 1 |
| 28 | RESERVED_1 | 0<br>0 | 0 | 0 |
| 29 | RESERVED_2 | 0<br>0 | 0 | 0 |
| 30 | NOTCH_START | 142d | - | 142d |
| 31 | NOTCH_WIDTH | 71d | - | 71d |
| 32 | RESERVED_3 | 0 | - | 0 |
| 33 | RESERVED_TONE | 0 | 0 | 0 |
| 34 | RESERVED_4 | 0 | 0 | 0 |

TRANSMITTER APPARATUS, INFORMATION PROCESSING METHOD, PROGRAM, AND TRANSMITTER SYSTEM

TECHNICAL FIELD

The present technology relates to a transmitter apparatus, an information processing method, a program, and a transmitter system, and more particularly, to a transmitter apparatus, an information processing method, a program, and a transmitter system capable of easily transmitting a wideband signal.

BACKGROUND ART

In broadcasting methods known in the art such as terrestrial digital television broadcast, typically, as illustrated in FIG. 1, a channel (physical channel) is defined at every constant frequency interval to send an independent signal through each channel. In the example of FIG. 1, the frequency interval is set to 8 MHz, and a guard band having a predetermined bandwidth is set between each channel in terms of interchannel interference and the like.

In a case where a guard band is set between each channel, a bandwidth of a single channel is limited to a channel interval or less. A bandwidth of the signal output by the transmitter that generates a transmit signal corresponding to a single channel for transmitting program data and the like is set to a channel interval or less. For example, in the case of ISDB-T as a Japanese terrestrial digital broadcast standard, the channel interval is set to 6 MHz. Therefore, a bandwidth necessary in the transmitter (frequency bandwidth of the outputtable signal necessary in the transmitter) becomes approximately 6 MHz at maximum.

CITATION LIST

Patent Documents

Patent Document 1: Japanese Patent Application Laid-Open No. 2000-261403
Patent Document 2: Japanese Patent Application Laid-Open No. 11-66637
Patent Document 3: Japanese Patent Application Laid-Open No. 2001-298437

SUMMARY OF THE INVENTION

Problems to be Solved by the Invention

By the way, there is known DVB-C2 as a European second generation cable digital broadcast standard. In order to receive Data Slice including Broadband Notch within Receiver Tuning Window, it is necessary to cause a DVB-C2 transmitter to match a transmit signal having a bandwidth of 8 MHz or higher.

However, in the current situation, it is difficult to transmit a signal having a bandwidth of 8 MHz or higher using a single transmitter. In addition, in order to provide a transmitter capable of transmitting a signal having a bandwidth of 8 MHz or higher, a circuit becomes large-scaled and complicated. It is conceived that this may increase cost.

In view of the aforementioned problems, the present technology provides a technology capable of easily transmitting a wideband signal.

Solutions to Problems

A transmitter apparatus of a first aspect of the present technology includes: a first acquisition unit that obtains first transmission control information; a second acquisition unit that obtains second transmission control information similar to information input to another transmitter apparatus; and a generating unit that processes transmission target data based on a parameter contained in the first transmission control information and generates data including the processed transmission target data and the second transmission control information.

The data generated by the generating unit are supplied to a signal processing apparatus connected to the transmitter apparatus. The signal processing apparatus can combine the data generated by the generating unit and data generated by the another transmitter apparatus having a configuration similar to that of the transmitter apparatus and output the combined data.

The parameter contained in the second transmission control information can include a parameter regarding the combined data.

The first transmission control information and the second transmission control information are L1 information of DVB-C2, and the generating unit can generate C2 Frame including Data Symbol representing the transmission target data and Preamble Symbol representing the second transmission control information.

The transmitter apparatus can further include: a selecting unit that selects whether or not Edge Pilot is inserted, and an insertion unit that controls Edge Pilot insertion for the C2 Frame generated by the generating unit depending on selection of the selecting unit.

In a case where the C2 Frame generated by the generating unit adjoins another C2 Frame generated by the another transmitter apparatus on a frequency axis, the insertion unit does not insert Edge Pilot into an edge adjoining the another C2 Frame out of both edges of the C2 Frame.

The first acquisition unit can obtain the first transmission control information from a control unit that generates the first transmission control information based on the second transmission control information, and the second acquisition unit can obtain the second transmission control information from the control unit.

The transmitter apparatus and the another transmitter apparatus can perform a processing based on a common clock signal.

The transmitter apparatus and the another transmitter apparatus can generate and output the data based on a common synchronization signal.

A transmitter system of a second aspect of the present technology includes: a transmitter apparatus; another transmitter apparatus; and a signal processing apparatus connected to the transmitter apparatus and the another transmitter apparatus, wherein the transmitter apparatus has a first acquisition unit that obtains first transmission control information, a second acquisition unit that obtains second transmission control information similar to information input to the another transmitter apparatus, and a generating unit that processes first transmission target data based on a parameter contained in the first transmission control information and generates first data including the processed first transmission target data and the second transmission control information, the another transmitter apparatus has a first acquisition unit that obtains another first transmission control information different from the first transmission control information obtained by the transmitter apparatus, a second acquisition unit that obtains the second transmission control information similar to information input to the transmitter apparatus, and a generating unit that processes second transmission target data based on a parameter contained in the another first transmission control information and generates second data including the processed second transmission target data and the second transmission control information, and the signal processing apparatus includes a combining unit that combines the first data generated by the transmitter apparatus and the second data generated by the another transmitter apparatus and outputs the combined data.

In the present technology, first transmission control information is obtained, second transmission control information similar to information input to another transmitter apparatus is obtained, transmission target data are processed based on a parameter contained the first transmission control information. In addition, data including the processed transmission target data and the second transmission control information are generated.

Effects of the Invention

According to the present technology, it is possible to easily transmit a wideband signal.

BRIEF DESCRIPTION OF DRAWINGS

FIG. 8 is a diagram illustrating parameters contained in L1 information.
FIG. 9 is a block diagram illustrating a configuration example of a transmitter system.
FIG. 17 is a diagram illustrating a specific example of L1 information.

MODE FOR CARRYING OUT THE INVENTION

<DVB-C2>

Figure 1:
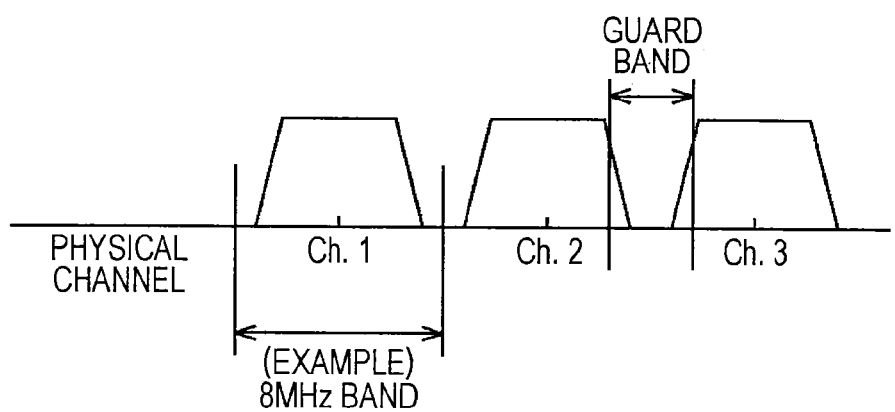
FIG. 1 is a diagram illustrating an example of a channel.
Figure 2:
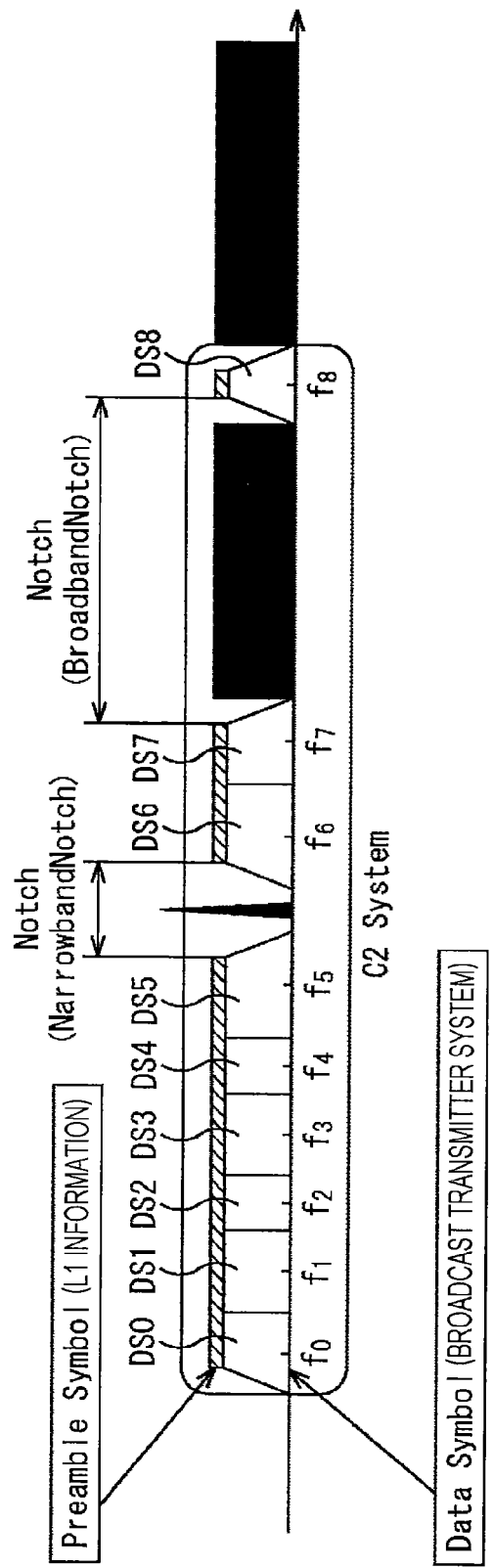
FIG. 2 is a diagram illustrating an example of a DVB-C2 signal.

First, DVB-C2 will be described.
FIG. 2 is a diagram illustrating an example of a DVB-C2 signal. In FIG. 2, the abscissa indicates a frequency. A single DVB-C2 signal is referred to as C2 System. C2 System includes Preamble Symbol and Data Symbol. According to the standard, a single C2 System becomes a signal having a bandwidth of approximately 3.5 GHz at maximum.

Preamble Symbol is a symbol used to transmit L1 information (L1 signalling part 2 data) which is transmission control information. The L1 information will be described in detail below. The same information is repeatedly transmitted using Preamble Symbol at a cycle of 3,408 carriers (a cycle of 3,408 subcarriers of orthogonal frequency division multiplex (OFDM)). 3,408 carriers correspond to a frequency band of 7.61 MHz.

Data Symbol is a symbol used to transmit Transport Stream (TS) such as program data. Data Symbol is divided into blocks called Data Slice. For example, different program data are transmitted using Data Slice 1 (DS1) and Data Slice 2 (DS2). Parameters regarding each Data Slice such as the number of Data Slices are contained in the L1 information.

As indicated by a black portion in FIG. 2, C2 System may include Notch. Notch is a frequency band reserved for FM broadcast, police wireless broadcast, military wireless broadcast, and the like and is not used to transmit C2 System. Out of the transmit signal output by the transmitter, no signal is transmitted within a Notch period. Notch includes Narrowband Notch having a width less than 48 carriers and Broadband Notch having a width exceeding 47 carriers (excluding 47 carriers). Parameters regarding each Notch, such as the number of Notches and a bandwidth, are also contained in the L1 information.

Figure 3:
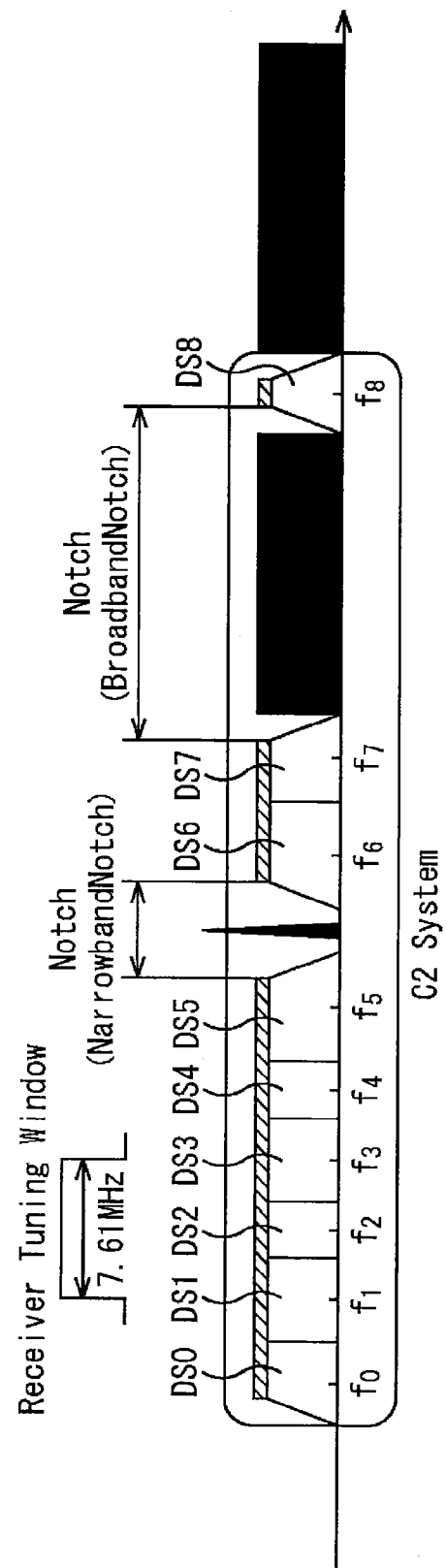
FIG. 3 is a diagram illustrating an example of setting Receiver Tuning Window.

In this manner, in DVB-C2, it is not necessary to provide a guard band between each channel, and a relatively narrow band interposed between Notches can also be used to transmit data. Therefore, a frequency band can be effectively used. A receiver sets Receiver Tuning Window having a bandwidth of 7.61 MHz as illustrated in FIG. 3, receives a signal within such a range, decodes the L1 information, and then decodes program data based on the decoded L1 information.

Figure 4:
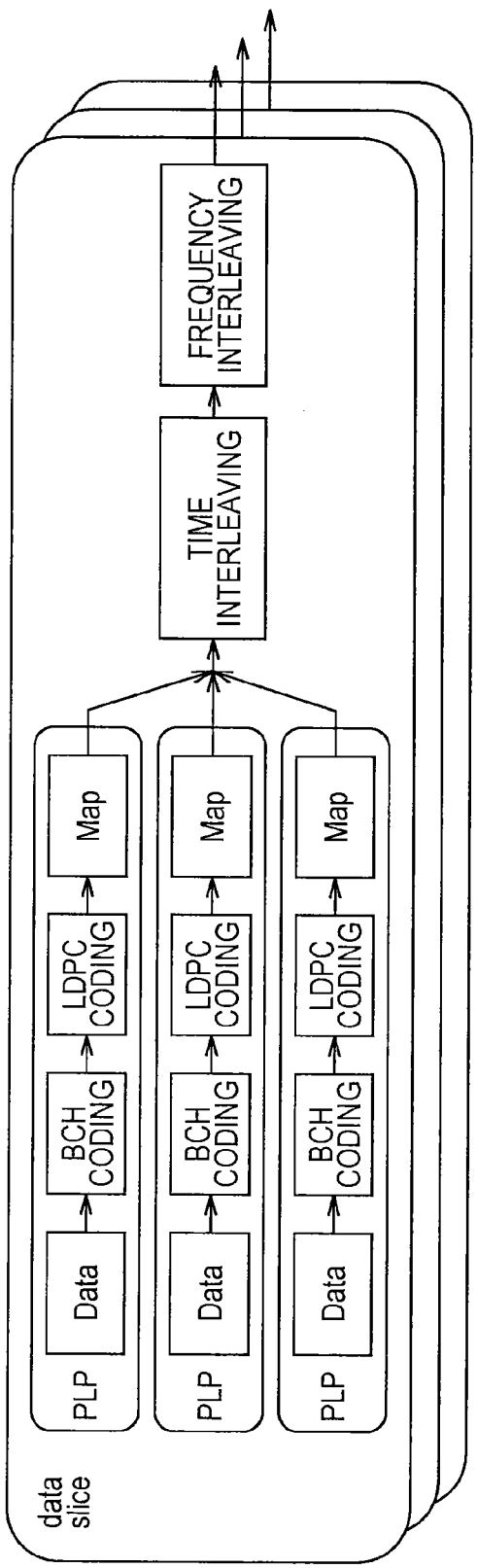
FIG. 4 is a diagram illustrating a concept of processing of transmission data.

FIG. 4 is a diagram illustrating a concept of the transmission data processing performed by the transmitter.

The transmission data such as program data are coded on a physical layer pipe (PLP) basis. In the example of FIG. 4, BCH coding, LDPC coding, and mapping to symbols on an IQ-plane are sequentially performed for every PLP data input to the transmitter. For all of the three PLP symbols obtained through each processing, time interleaving and frequency interleaving are sequentially performed, so that a single Data Slice is generated. In this manner, the transmitter performs the data coding on a PLP basis and performs interleaving on a Data Slice basis.

Data Symbol includes from a plurality of Data Slices generated in this manner and is transmitted along with Preamble Symbol. Preamble Symbol is generated by performing coding and the like for the L1 information.

Figure 5:
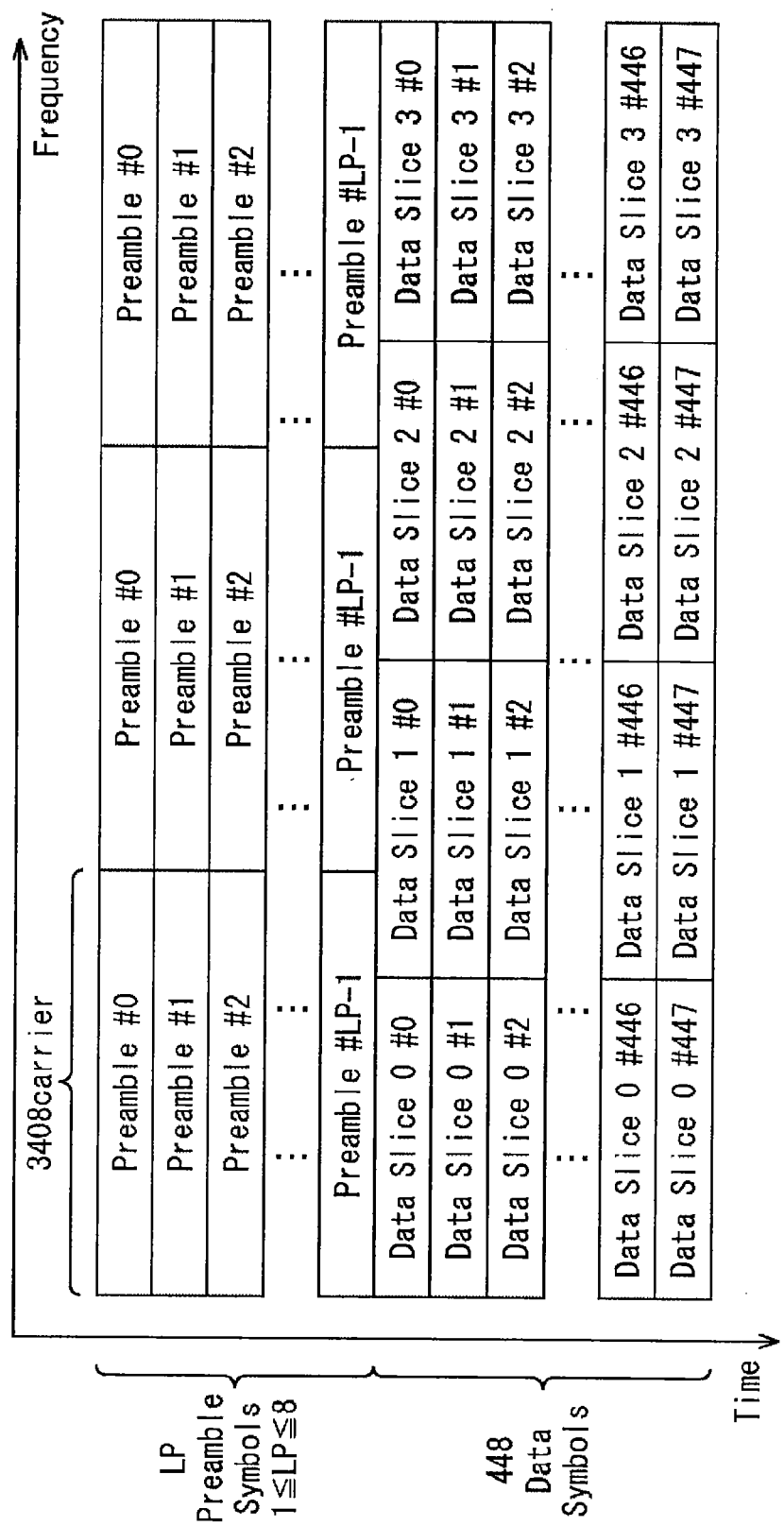
FIG. 5 is a diagram illustrating a configuration of C2 Frame.

FIG. 5 is a diagram illustrating a configuration of C2 Frame. C2 Frame includes at least one Preamble Symbol and a plurality of Data Symbols. In FIG. 5, the abscissa indicates a frequency, and the ordinate indicates time (symbol).

Preamble Symbol is repeatedly transmitted at an interval of 3,408 carriers across 1st to 8th blocks as seen in a time direction. In FIG. 5, the similarly numbered blocks of Preamble Symbols denote Preamble Symbols used to transmit the same L1 information.

Subsequent to Preamble Symbol, Data Symbol is transmitted across 448 symbols. In the example of FIG. 5, data of each of Data Slices 0 to 3 are transmitted using 448 Data Symbols.

Figure 6:
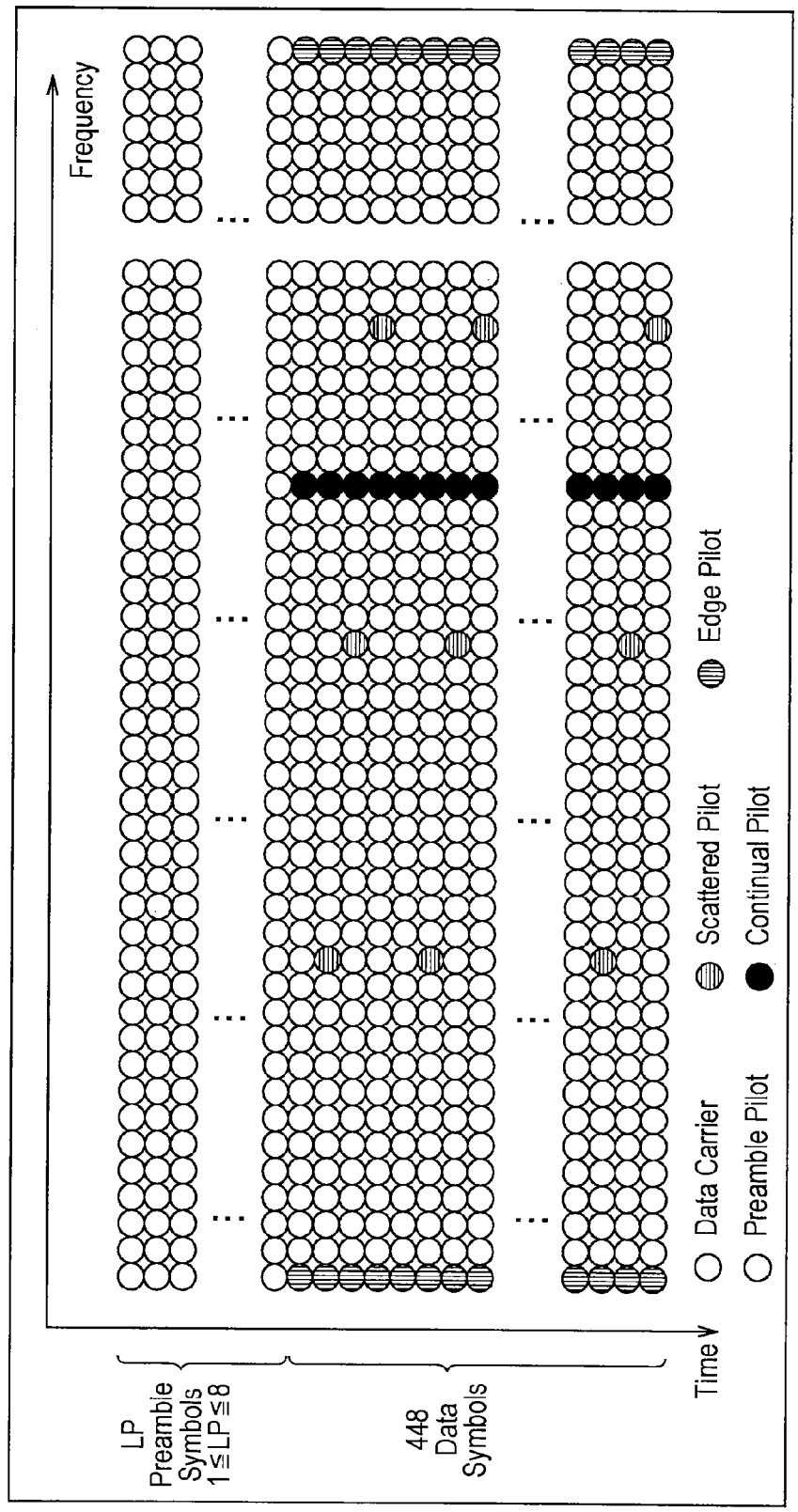
FIG. 6 is a diagram illustrating carrier arrangement of C2 Frame.

FIG. 6 is a diagram illustrating carrier arrangement of C2 Frame. White circles denote Preamble Symbols or Data Symbols, and colored or hatched circles denote Pilot signals.

As illustrated in FIG. 6, Preamble Pilot is inserted between Preamble Symbols at an interval of 6 carriers. In addition, Scattered Pilot is periodically inserted between Data Symbols, and Continual Pilot is regularly inserted. Edge Pilot is inserted into both edges of Data Symbol.

For example, in C2 System having the configuration of FIG. 2, Edge Pilot is inserted into the left edge of Data Symbol of Data Slice 0 and the right edge of Data Symbol of Data Slice 5. In addition, Edge Pilot is inserted into each of the left edge of Data Symbol of Data Slice 6, the right edge of Data Symbol of Data Slice 7, both edges of Data Symbol of Data Slice 8. That is, as seen from the viewpoint of entire C2 System, Edge Pilot is inserted into both edges of C2 System (at positions of symbols having the lowest frequency and the highest frequency) and the positions interposing Notch.

Figure 7:
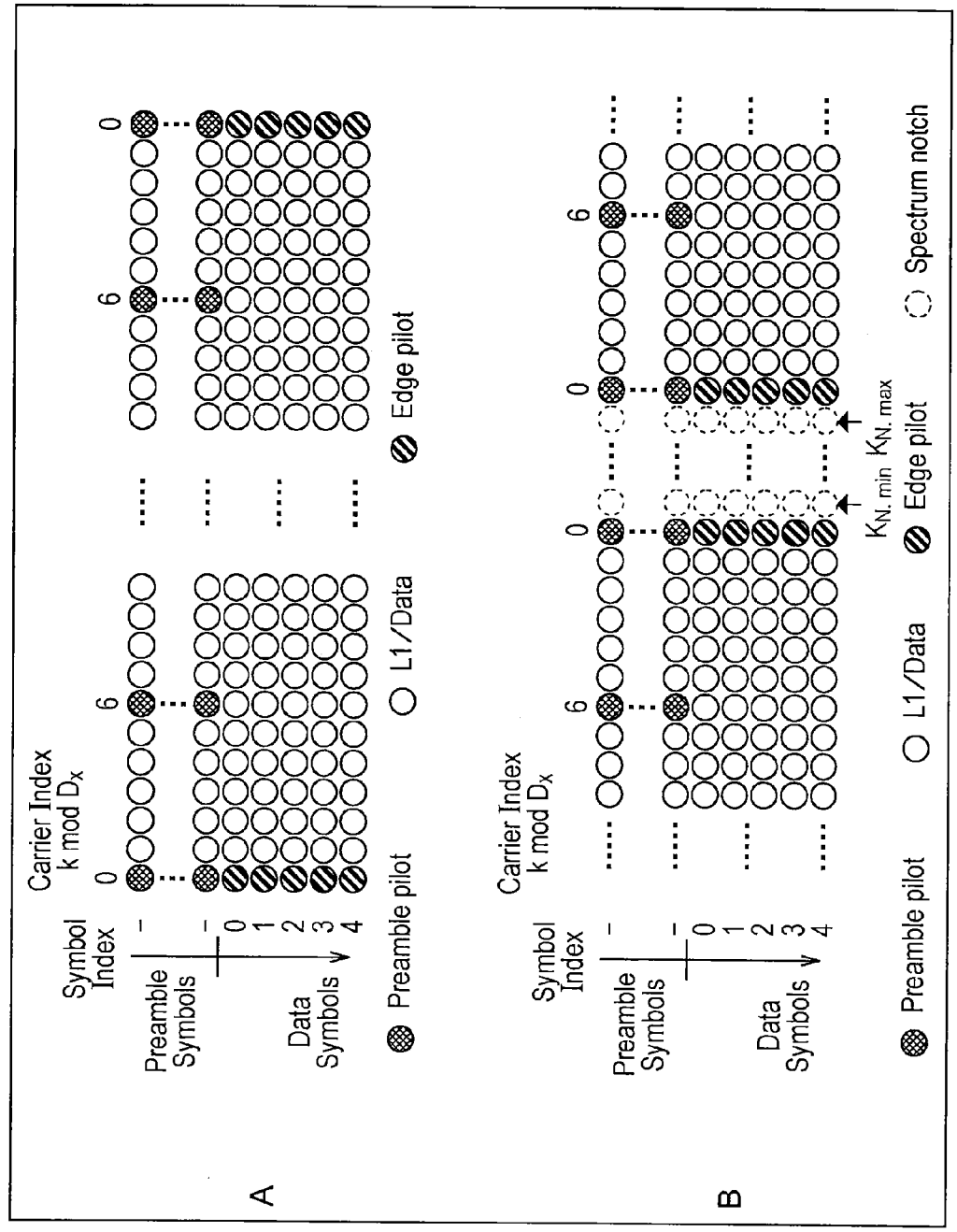
FIG. 7 is a diagram illustrating a status of Edge Pilot.

Therefore, in a case where Preamble Pilot in Preamble Symbol and Edge Pilot in Data Symbol are indicated as a Pilot signal, as illustrated in FIG. 7A, a status of Edge Pilot is inserted into both edges of C2 System when Notch is not included in C2 System. In addition, when Notch is included in C2 System, a status of Edge Pilot is inserted into both edges of C2 System and both edges adjoining Notch as illustrated in FIG. 7B.

FIG. 8 is a diagram illustrating parameters included in L1 information. Main parameters will be described.

START_FREQUENCY of the 3rd row refers to a frequency serving as a start position of C2 System. The start position is expressed as an absolute frequency by using 0 Hz as a starting point. C2_BANDWIDTH of the 4th row refers to a bandwidth of C2 System.

GUARD_INTERVAL of the 5th row refers to a size of the guard interval included in each symbol. C2_FRAME_LENGTH of the 6th row refers to the number of Data Symbols included in C2 Frame. In the example of FIG. 6, C2_FRAME_LENGTH is set to a value "448".

NUM_DSLICE of the 8th row refers to the number of Data Slices included in C2 Frame. NUM_NOTCH of the 9th row refers to the number of Notches included in C2 Frame. Each parameter from the 10th row to the 45th row is described for each Data Slice.

DSLICE_ID of the 11th row refers to an identification ID of Data Slice in C2 System. DSLICE_TUNE_POS of the 12th row refers to a position (center frequency) serving as a tuning point for receiving Data Slice with respect to the frequency represented by START_FREQUENCY. DSLICE_TI_DEPTH of the 15th row refers to Depth of the time interleaving.

DSLICE_LEFT_NOTCH of the 21st row indicates whether or not there is Notch in the left side of Data Slice. DSLICE_NUM_PLP of the 22nd row refers to the number of PLPs included in Data Slice. Each parameter of the 23rd to 43rd rows is described for each PLP.

Each parameter of the 46th to 50th rows is described for each Notch. NOTCH_START of the 47th row refers to a position of Notch with respect to the frequency represented by START_FREQUENCY. NOTCH_WIDTH of the 48th row refers to a bandwidth of Notch.

Details of DVB-C2 are described in "Digital Video Broadcasting (DVB), Frame structure channel coding and modulation for a second generation digital transmission system for cable systems (DVB-C2)" (DVB Document A138).

[First Embodiment]
<Configuration of Transmitter System>

FIG. 9 is a block diagram illustrating a configuration example of a transmitter system according to an embodiment of the present technology.

The transmitter system of FIG. 9 includes transmitter apparatuses 1A to 1C and a signal processing apparatus 2. The transmitter apparatuses 1A to 1C are apparatuses that generate and output a signal of C2 Frame having a predetermined bandwidth such as 8 MHz and have the same configuration.

Each of the transmitter apparatuses 1A to 1C receives transmission target data such as program data and L1 information used to generate a signal of C2 Frame.

The transmitter apparatus 1A receives signal generation L1 information used to generate a signal of C2 Frame for transmitting data allocated to the transmitter apparatus 1A. The transmitter apparatus 1B receives signal generation L1 information used to generate a signal of C2 Frame for transmitting data allocated to transmitter apparatus 1B. The transmitter apparatus 1C receives signal generation L1 information used to generate a signal of C2 Frame for transmitting data allocated to the transmitter apparatus 1C.

The signal generation L1 information input to the transmitter apparatuses 1A to 1C has at least a different part of parameters depending on data transmitted by each apparatus or a frequency band used by each apparatus in transmission of data.

The transmitter apparatuses 1A to 1C receive transmission L1 information for transmission using the signal of C2 Frame along with transmission target data in addition to the signal generation L1 information. The transmission L1 information input to the transmitter apparatus 1A, the transmission L1 information input to the transmitter apparatus 1B, and the transmission L1 information input to the transmitter apparatus 1C are the same information.

The transmitter apparatus 1A processes the data input as transmission target based on the signal generation L1 information to generate Data Symbol representing transmission target data. In addition, the transmitter apparatus 1A generates Preamble Symbol representing the input transmission L1 information. The transmitter apparatus 1A generates C2 Frame based on Data Symbol representing the generated transmission target data and Preamble Symbol representing transmission L1 information and outputs the signal of C2 Frame to the signal processing apparatus 2.

Similarly, the transmitter apparatus 1B processes the data input as transmission target based on the signal generation L1 information to generate Data Symbol representing transmission target data. In addition, the transmitter apparatus 1B generates Preamble Symbol representing the input transmission L1 information. The transmitter apparatus 1B generates C2 Frame based on Data Symbol representing the generated transmission target data and Preamble Symbol representing transmission L1 information and outputs the signal of C2 Frame to the signal processing apparatus 2.

The transmitter apparatus 1C processes the data input as transmission target based on the signal generation L1 information to generate Data Symbol representing transmission target data. In addition, the transmitter apparatus 1C generates Preamble Symbol representing the input transmission L1 information. The transmitter apparatus 1C generates C2 Frame based on Data Symbol representing the generated transmission target data and Preamble Symbol representing transmission L1 information and outputs the signal of C2 Frame to the signal processing apparatus 2.

The signal processing apparatus 2 combines the signals of C2 Frame supplied from the transmitter apparatuses 1A to 1C into a single signal of C2 Frame by arranging side by side the signals of C2 Frame on a frequency basis and outputs the single signal of C2 System. The signal output from the signal processing apparatus 2 is transmitted to a receiving-side apparatus via a cable line.

Figure 10:
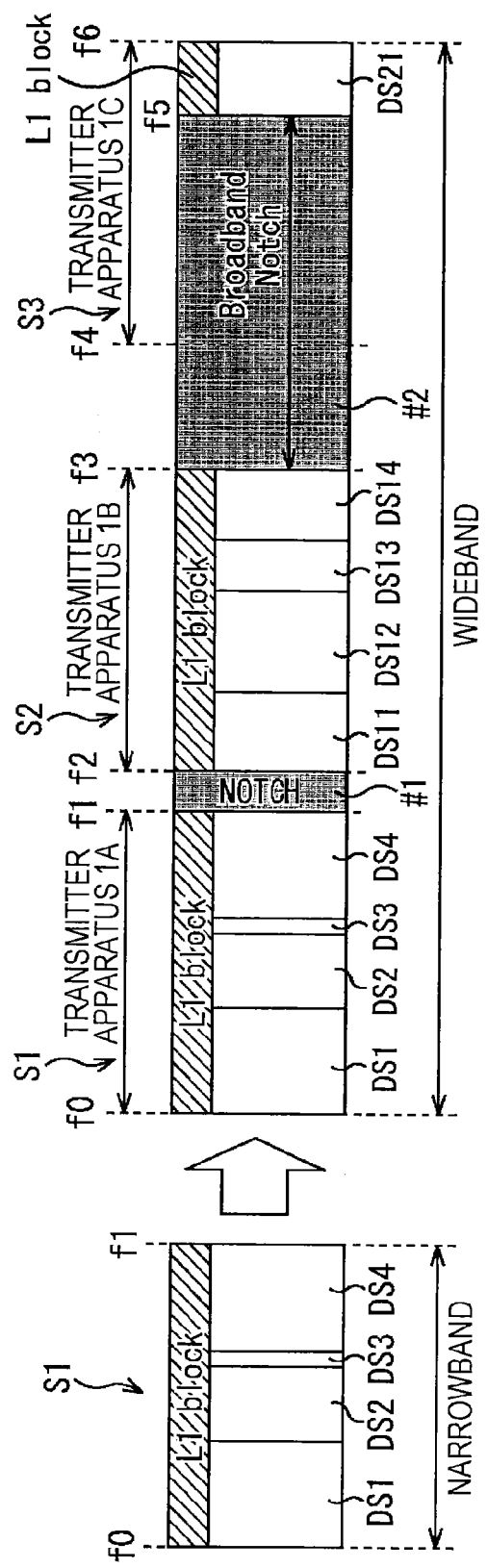
FIG. 10 is a diagram illustrating a concept of signal combining.

FIG. 10 is a diagram illustrating a concept of signal combining.

A signal S1 having a frequency band f0 to f1 illustrated in the left side of FIG. 10 is a signal of C2 Frame generated by the transmitter apparatus 1A. The signal S1 includes Data Symbols of Data Slices 1 to 4 and Preamble Symbol (L1 block) representing transmission L1 information. For example, the bandwidth of frequencies f0 to f1 is set to 7.61 MHz.

Such a narrowband signal is also generated for the transmitter apparatus 1B and the transmitter apparatus 1C and is combined by the signal processing apparatus 2 as indicated by the edge of the white arrow.

In the example of FIG. 10, the signal S2 having a frequency band f2 to f3 is a signal of C2 Frame generated by the transmitter apparatus 1B. The signal S2 includes Data Symbols of Data Slices 11 to 14 and Preamble Symbol representing transmission L1 information. The bandwidth of frequencies f2 to f3 is also set to 7.61 MHz.

The signal S3 of the frequency band f4 to f6 is a signal of C2 Frame generated by the transmitter apparatus 1C. Notch is included in the frequency band f4 to f5 out of the frequencies f4 to f6. The signal S3 includes Data Symbol of Data Slice 21 and Preamble Symbol representing transmission L1 information. The bandwidth of the frequencies f4 to f6 is also set to 7.61 MHz.

The signal processing apparatus 2 generates a single wideband signal of C2 System by arranging side by side the signals S1 to S3 on a frequency basis. The combined signal of C2 System generated by the signal processing apparatus 2 becomes a signal having a bandwidth equal to or higher than 7.61 MHz that can be solely output by a single transmitter apparatus.

Notch# 1 is formed in a band between the frequency f1 as a trailing end frequency of the signal S1 and the frequency f2 as a leading end frequency of the signal S2. In addition, Notch# 2 is formed in a band between the frequency f3 as a trailing end frequency of the signal S2 and the frequency f5 as a leading end frequency of Data Slice 21 of the signal S3.

The transmission L1 information commonly included in the signals S1 to S3 contains parameters regarding each of Data Slices 1 to 4, 11 to 14, and 21 and parameters regarding Notch# 1 and Notch# 2. That is, parameters regarding entire C2 System after the combining are input to each of the transmitter apparatuses 1A to 1C as transmission L1 information.

As a result, it is possible to easily generate a wideband signal exceeding the bandwidth suitable for a single transmitter apparatus. In addition, it is possible to suppress cost, compared to a case where a single transmitter apparatus capable of generating a wideband signal is provided. As described above, in a case where a single transmitter apparatus capable of generating a wideband signal is provided, a circuit becomes large-scaled and complicated, and this increases cost. However, such a problem can be prevented according to the present technology.

L1 information included in the combined signal contains parameters regarding entire C2 System after the combining. Therefore, a receiving-side apparatus can obtain predetermined data included in the combined signal by decoding L1 information included in a predetermined period.

As described below, a signal processing such as inverse fast Fourier transform (IFFT) is performed for the transmitter apparatuses 1A to 1C. In a case where a wideband signal is generated in a single transmitter apparatus, Broadband Notch is included in the band. If a width thereof is large, the signal processing is performed also for a non-signal period, and this increases wastefulness. Such a problem can also be prevented according to the present technology.

<Configuration of Transmitter Apparatus>

Figure 11:
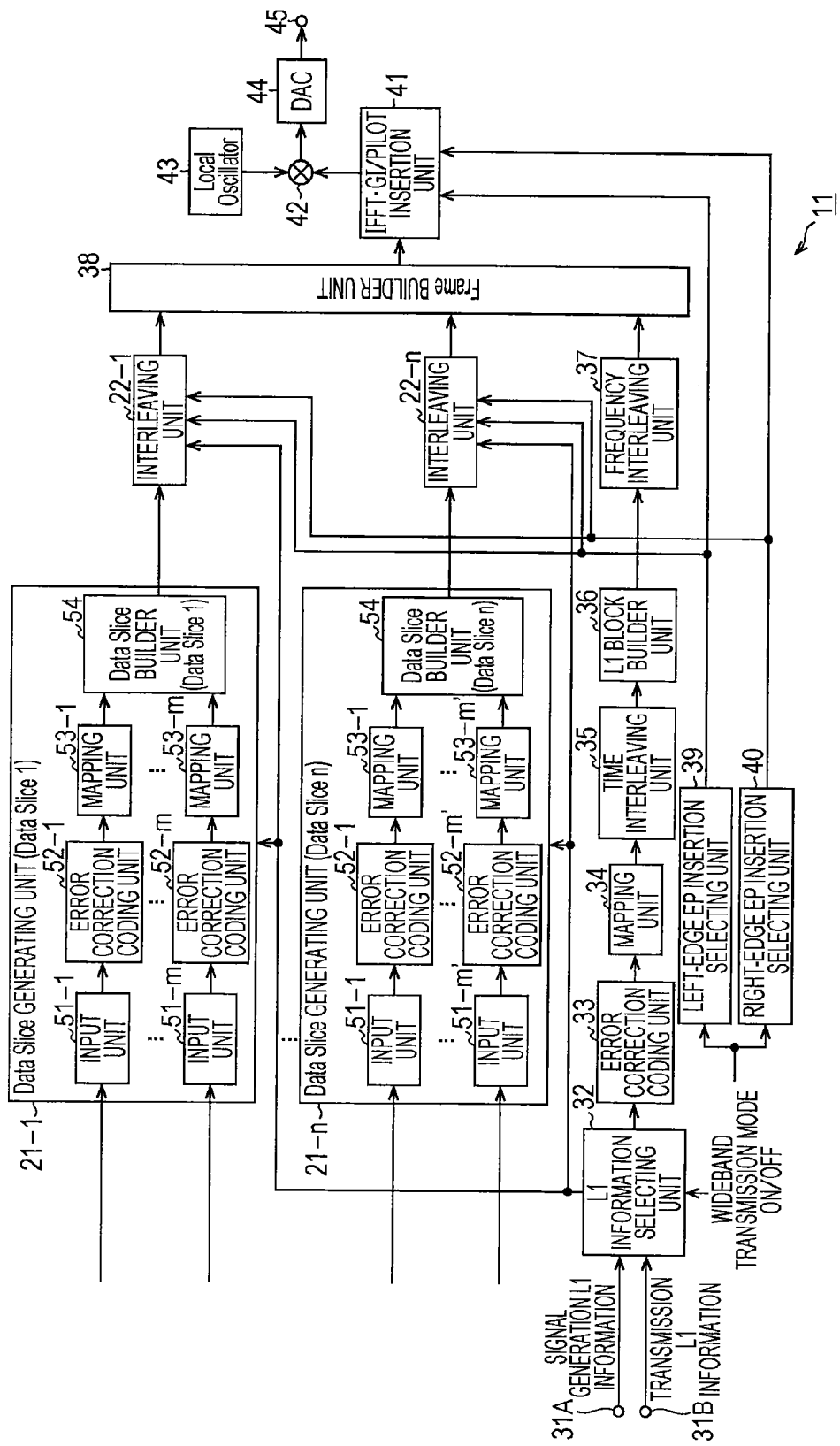
FIG. 11 is a diagram illustrating a configuration example of a transmitter apparatus.

FIG. 11 is a diagram illustrating a configuration example of the transmitter apparatus 1A. A signal processing apparatus 11 of FIG. 11 is also provided in the transmitter apparatuses 1B and 1C.

Data of PLP included in each Data Slice as the transmission target data are input to Data Slice generating units 21-1 to 21-n. The data of PLP included in Data Slice 1 are input to the Data Slice generating unit 21-1, and the data of PLP included in Data Slice n are input to the Data Slice generating unit 21-n. For example, the value "n" is controlled by NUM_DSLICE (the 8th row in FIG. 8) contained in the signal generation L1 information.

The signal generation L1 information input to an input terminal 31A and the transmission L1 information input to an input terminal 31B are input to an L1 information selecting unit 32. For example, a computer is connected to the input terminals 31A and 31B through a cable. The signal generation L1 information and the transmission L1 information input by an administrator of the transmitter system of FIG. 9 using a computer are supplied from the computer to the input terminals 31A and 31B of the signal processing apparatus 11. Hereinafter, the signal generation L1 information will be simply referred to as signal generation L1 information, and the transmission L1 information will be simply referred to as transmission L1 information.

In a predetermined position of the casing of the transmitter apparatus 1A, a switch is provided to switch on/off a wideband transmission mode in which wideband signals are generated for the outputs of a plurality of transmitter apparatuses. When an administrator of the transmitter system operates the switch, a signal representing the on/off of the wideband transmission mode is supplied to the L1 information selecting unit 32, a left-edge EP insertion selecting unit 39, and a right-edge EP insertion selecting unit 40.

The Data Slice generating unit 21-1 performs the processing based on parameters contained in the signal generation L1 information supplied from the L1 information selecting unit 32 to generate Data Slice 1. The Data Slice generating unit 21-1 outputs data of Data Slice 1 to the interleaving unit 22-1.

The Data Slice generating unit 21-1 includes input units 51-1 to 51-m, error correction coding units 52-1 to 52-m, mapping units 53-1 to 53-m, and a Data Slice builder unit 54. For example, the value "m" is controlled by DSLICE_NUM_PLP (22nd row of FIG. 8) for Data Slice 1 contained in signal generation L1 information. Although the input unit 51-1, the error correction coding unit 52-1, and the mapping unit 53-1 are described, the processing is similarly applied to the input unit 51-m, the error correction coding unit 52-m, and the mapping unit 53-m.

The input unit 51-1 obtains data of single PLP out of the transmission target data allocated to the transmitter apparatus 1A, such as program data, and outputs the obtained data to the error correction coding unit 52-1.

The error correction coding unit 52-1 performs error correction coding for the data as described in conjunction with FIG. 4. The error correction coding unit 52-1 applies processings such as bit interleaving for the coded data obtained through BCH coding and LDPC coding and outputs the processed data to the mapping unit 53-1.

The mapping unit 53-1 performs mapping of coded data supplied from the error correction coding unit 52-1 on an IQ-plane as symbols and outputs the result to the Data Slice builder unit 54.

The Data Slice builder unit 54 arranges data of each symbol supplied from the mapping unit 53-1 as described in conjunction with FIG. 6 to generate Data Slice 1. For example, a frequency of Data Slice 1 and the like are specified based on the parameter contained in the signal generation L1 information selected by the L1 information selecting unit 32 to generate Data Slice 1. The Data Slice builder unit 54 outputs data of Data Slice 1 to the interleaving unit 22-1.

The interleaving unit 22-1 performs time interleaving and frequency interleaving for Data Symbol of Data Slice 1 supplied from the Data Slice generating unit 21-1. For example, the interleaving unit 22-1 performs the processing depending on Depth indicated by DSLICE_TI_DEPTH (15th row of FIG. 8) of Data Slice 1 contained in the signal generation L1 information selected by the L1 information selecting unit 32 when the time interleaving is performed.

In addition, the interleaving unit 22-1 performs interleaving for Data Symbol except for Edge Pilot in a case where Edge Pilot is inserted into Data Slice 1. Information representing whether or not Edge Pilot is inserted into the left edge of Data Symbol output by the transmitter apparatus 1A is supplied from the left-edge EP insertion selecting unit 39. Furthermore, information representing whether or not Edge Pilot is inserted into the right edge of Data Symbol output by the transmitter apparatus 1A is supplied from the right-edge EP insertion selecting unit 40.

The interleaving unit 22-1 outputs data of Data Slice 1 obtained by performing the time interleaving and the frequency interleaving to a Frame builder unit 38.

The Data Slice generating unit 21-n includes input units 51-1 to 51-m', error correction coding units 52-1 to 52-m', mapping units 53-1 to 53-m', and a Data Slice builder unit 54. For example, the value "m'" is controlled by DSLICE_NUM_PLP for Data Slice n contained in the signal generation L1 information. Similar to the Data Slice generating unit 21-1, the Data Slice generating unit 21-n performs coding, mapping, and the like for the input data to generate Data Slice n and outputs the result to the interleaving unit 22-n.

Similar to the interleaving unit 22-1, the interleaving unit 22-n performs time interleaving and frequency interleaving for Data Symbol of Data Slice n supplied from the Data Slice generating unit 21-n. The interleaving unit 22-n performs the processing based on Depth indicated by DSLICE_TI_DEPTH of Data Slice n contained in the signal generation L1 information selected by the L1 information selecting unit 32 when the time interleaving is performed. In addition, the interleaving unit 22-n interleaves Data Symbol except for Edge Pilot in a case where Edge Pilot is inserted into the right edge of Data Slice n.

The interleaving unit 22-n outputs data of Data Slice n obtained by performing the time interleaving and the frequency interleaving to the Frame builder unit 38.

Ina case where a wideband transmission mode is switched on, the L1 information selecting unit 32 obtains the signal generation L1 information input to the input terminal 31A and outputs the signal generation L1 information to the Data Slice generating units 21-1 to 21-n and the interleaving units 22-1 to 22-n. The signal generation L1 information output from the L1 information selecting unit 32 is used to generate each Data Slice as described above. In addition, in a case where the wideband transmission mode is switched on, the L1 information selecting unit 32 obtains the transmission L1 information input to the input terminal 31B and outputs the transmission L1 information to the error correction coding unit 33. The L1 information selecting unit 32 servers as an acquisition unit that obtains the signal generation L1 information and an acquisition unit that obtains the transmission L1 information.

In a case where a wideband transmission mode is switched off, the L1 information selecting unit 32 also outputs the signal generation L1 information to the Data Slice generating units 21-1 to 21-n, the interleaving units 22-1 to 22-n, and the error correction coding unit 33.

The error correction coding unit 33 performs coding for the transmission L1 information supplied from the L1 information selecting unit 32. The error correction coding unit 33 performs a processing such as bit interleaving for the coded data obtained through BCH coding and LDPC coding and outputs the processed data to the mapping unit 34.

The mapping unit 34 performs mapping for the coded data of the transmission L1 information supplied from the error correction coding unit 33 on an IQ-plane as a symbol and outputs the symbol representing the transmission L1 information to the time interleaving unit 35.

The time interleaving unit 35 performs time interleaving for the symbols representing the transmission L1 information supplied from the mapping unit 34 and outputs the result to a L1 block builder unit 36.

The L1 block builder unit 36 arranges each symbol representing the transmission L1 information supplied from the time interleaving unit 35 as described in conjunction with FIG. 6 to generate an L1 block including Preamble Symbol. The L1 block builder unit 36 outputs data of the L1 block to a frequency interleaving unit 37.

The frequency interleaving unit 37 performs frequency interleaving for Preamble Symbol of the L1 block supplied from the L1 block builder unit 36 and outputs the result to the Frame builder unit 38.

The Frame builder unit 38 generates Data Symbol based on data of Data Slice 1 supplied from the interleaving unit 22-1 and data of Data Slice n supplied from the interleaving unit 22-n. In addition, the Frame builder unit 38 adds Preamble Symbol representing the transmission L1 information supplied from the frequency interleaving unit 37 to Data Symbols of Data Slice 1 to n to generate C2 Frame. The Frame builder unit 38 outputs the generated C2 Frame data to an IFFT•GI/pilot insertion unit 41.

The left-edge EP insertion selecting unit 39 selects whether or not Edge Pilot is inserted into the left edge of Data Symbol output by the transmitter apparatus 1A and outputs information representing whether or not Edge Pilot is inserted. The information output by the left-edge EP insertion selecting unit 39 is switched, for example, depending on operation of an administrator for the switch provided in the transmitter apparatus 1A.

The right-edge EP insertion selecting unit 40 selects whether or not Edge Pilot is inserted into the right edge of Data Symbol output by the transmitter apparatus 1A and outputs information representing whether or not Edge Pilot is inserted. The information output by the right-edge EP insertion selecting unit 40 is switched, for example, depending on operation of an administrator for the switch provided in the transmitter apparatus 1A. The information output from the left-edge EP insertion selecting unit 39 and the right-edge EP insertion selecting unit 40 is supplied to the interleaving units 22-1 to 22-n and the IFFT•GI/pilot insertion unit 41.

The IFFT•GI/pilot insertion unit 41 performs IFFT for C2 Frame supplied from the Frame builder unit 38 and inserts the guard interval GI.

The IFFT•GI/pilot insertion unit 41 inserts a Pilot signal to C2 Frame supplied from the Frame builder unit 38. That is, the IFFT•GI/pilot insertion unit 41 inserts Preamble Pilot into Preamble Symbol at an interval of 6 carriers as described in conjunction with FIG. 6 and inserts Scattered Pilot and Continual Pilot into Data Symbol. The IFFT•GI/pilot insertion unit 41 appropriately inserts Edge Pilot into an edge of Data Symbol of C2 Frame with reference to the information supplied from the left-edge EP insertion selecting unit 39 and the right-edge EP insertion selecting unit 40.

For example, in a case where a fact that Edge Pilot is inserted into the left edge of Data Symbol is indicated by the information supplied from the left-edge EP insertion selecting unit 39, the IFFT•GI/pilot insertion unit 41 inserts Edge Pilot to the left edge of Data Symbol (left edge of Data Slice 1). Meanwhile, in a case where it is indicated that Edge Pilot is not inserted into the left edge of Data Symbol, the IFFT•GI/pilot insertion unit 41 does not insert Edge Pilot into the left edge of Data Symbol.

In a case where the information supplied from the right-edge EP insertion selecting unit 40 indicates that Edge Pilot is inserted into the right edge of Data Symbol, the IFFT•GI/pilot insertion unit 41 inserts Edge Pilot into the right edge of Data Symbol (right edge of Data Slice n). Meanwhile, in a case where it is indicated that Edge Pilot is not inserted into the right edge of Data Symbol, the IFFT•GI/pilot insertion unit 41 does not insert Edge Pilot into the right edge of Data Symbol.

In this manner, if whether or not Edge Pilot is inserted into the edge of Data Symbol output by the transmitter apparatus 1A is selected, it is possible to arrange Data Symbols generated by other transmitter apparatuses in continual positions on a frequency axis.

Figure 12:
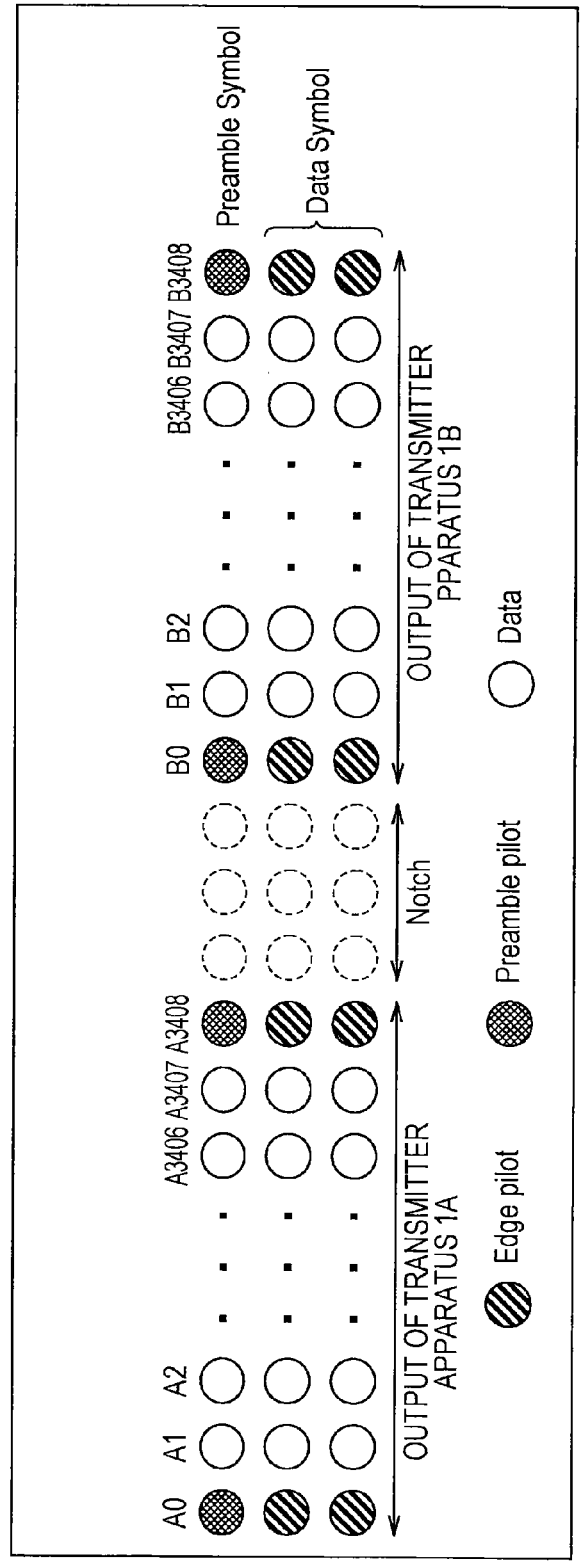
FIG. 12 is a diagram illustrating an example of Edge Pilot insertion.

FIG. 12 is a diagram illustrating an example of combining C2 Frame generated by the transmitter apparatus 1A and C2 Frame generated by the transmitter apparatus 1B.

In the example of FIG. 12, Edge Pilot is inserted into each of the position of Data Symbol of a carrier number A0 and the position of Data Symbol of a carrier number A3408, corresponding to both edges of C2 Frame generated by the transmitter apparatus 1A. In addition, Edge Pilot is inserted into each of the position of Data Symbol of a carrier number B0 and the position of Data Symbol of a carrier number B3408 corresponding to both edges of C2 Frame generated by the transmitter apparatus 1B.

In DVB-C2, the position where Edge Pilot can be inserted except for the edge of the band (C2 System) is set to only both edges of Notch. That is, in this case, it is necessary to treat a gap between the output of the transmitter apparatus 1A and the output of the transmitter apparatus 1B as Notch as indicated by the dotted-line circle. Therefore, it is not possible to continually arrange the output of the transmitter apparatus 1A and the output of the transmitter apparatus 1B in a frequency domain.

Figure 13:
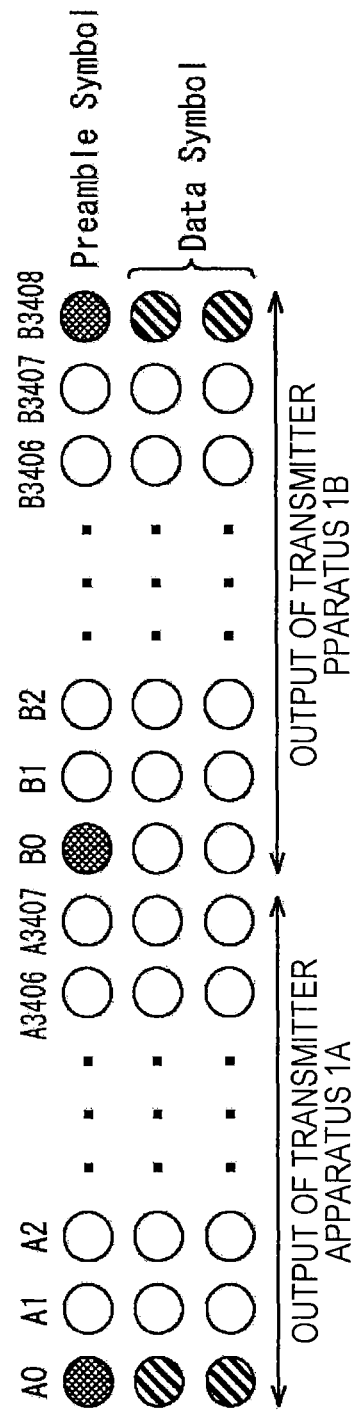
FIG. 13 is a diagram illustrating another example of Edge Pilot insertion.

In this regard, as illustrated in FIG. 13, if Edge Pilot is not inserted into the right edge of the output of the transmitter apparatus 1A and the left edge of the output of the transmitter apparatus 1B, it is not necessary to treat a gap between the output of the transmitter apparatus 1A and the output of the transmitter apparatus 1B as Notch. Therefore, it is possible to continually arrange each output in a frequency domain.

In the example of FIG. 13, Edge Pilot is not inserted into the position of Data Symbol of the carrier number A3408 corresponding to the right edge of C2 Frame generated by the transmitter apparatus 1A (no data is in the carrier number A3408). This is implemented such that information indicating a fact that Edge Pilot is inserted into the left edge is output from the left-edge EP insertion selecting unit 39 of the transmitter apparatus 1A to the IFFT•GI/pilot insertion unit 41, and information indicating a fact that Edge Pilot is not inserted into the right edge is output from the right-edge EP insertion selecting unit 40 to the IFFT•GI/pilot insertion unit 41.

In the example of FIG. 13, instead of Edge Pilot, a typical data carrier is inserted into the position of Data Symbol of the carrier number B0 corresponding to the left edge of C2 Frame generated by the transmitter apparatus 1B. This is implemented such that information indicating a fact that Edge Pilot is not inserted into the left edge is output from the left-edge EP insertion selecting unit 39 of the transmitter apparatus 1B to the IFFT•GI/pilot insertion unit 41, and information indicating a fact that Edge Pilot is inserted into the right edge is output from the right-edge EP insertion selecting unit 40 to the IFFT•GI/pilot insertion unit 41.

In this manner, in a case where C2 Frame generated by the Frame builder unit 38 adjoins C2 Frame generated by another transmitter apparatus on a frequency axis, the IFFT•GI/pilot insertion unit 41 controls Edge Pilot insertion so as not to insert Edge Pilot into the edge adjoining C2 Frame generated by another transmitter apparatus out of both edges of C2 Frame. The IFFT•GI/pilot insertion unit 41 outputs, to a multiplier unit 42, data of C2 Frame subjected to the processing such as IFFT as a baseband signal.

In addition, Edge Pilot may not be inserted into both edges as well as one edge of C2 Frame. For example, it is conceivable that C2 Frame generated by the transmitter apparatus 1A, C2 Frame generated by the transmitter apparatus 1B, and C2 Frame generated by the transmitter apparatus 1C are sequentially arranged side by side on a frequency axis to generate C2 System. C2 Frame generated by the transmitter apparatus 1B is interposed between C2 Frames generated by the transmitter apparatus 1A and the transmitter apparatus 1C.

In this case, Edge Pilot is inserted only into the left edge of C2 Frame generated by the transmitter apparatus 1A and the right edge of C2 Frame generated by the transmitter apparatus 1C which are both ends of C2 System. Edge Pilot is not inserted into other edges of C2 Frames.

In the transmitter apparatus 1A, information indicating a fact that Edge Pilot is inserted into the left edge is output from the left-edge EP insertion selecting unit 39, and information indicating a fact that Edge Pilot is not inserted into the right edge is output from the right-edge EP insertion selecting unit 40. In addition, in the transmitter apparatus 1B, information indicating a fact that the Edge Pilot is not inserted into the left edge is output from the left-edge EP insertion selecting unit 39, and information indicating a fact that Edge Pilot is not inserted into the right edge is output from the right-edge EP insertion selecting unit 40. Furthermore, in the transmitter apparatus 1C, information indicating a fact that Edge Pilot is not inserted into the left edge is output from the left-edge EP insertion selecting unit 39, and information indicating a fact that Edge Pilot is inserted into the right edge is output from the right-edge EP insertion selecting unit 40.

The multiplier unit 42 of FIG. 11 performs frequency conversion by multiplying the baseband signal supplied from the IFFT•GI/pilot insertion unit 41 and a signal having a predetermined frequency supplied from a Local Oscillator 43. The multiplier unit 42 outputs the signal subjected to the frequency conversion to a digital analog converter (DAC) 44.

DAC 44 performs D/A conversion for the signal supplied from the multiplier unit 42 and outputs an IF signal obtained through D/A conversion from an output terminal 45. The IF signal output from the output terminal 45 is supplied to the signal processing apparatus 2 along with the IF signals output from the output terminals 45 of the transmitter apparatuses 1B and 1C.

<Operation of Transmitter System>

Figure 14:
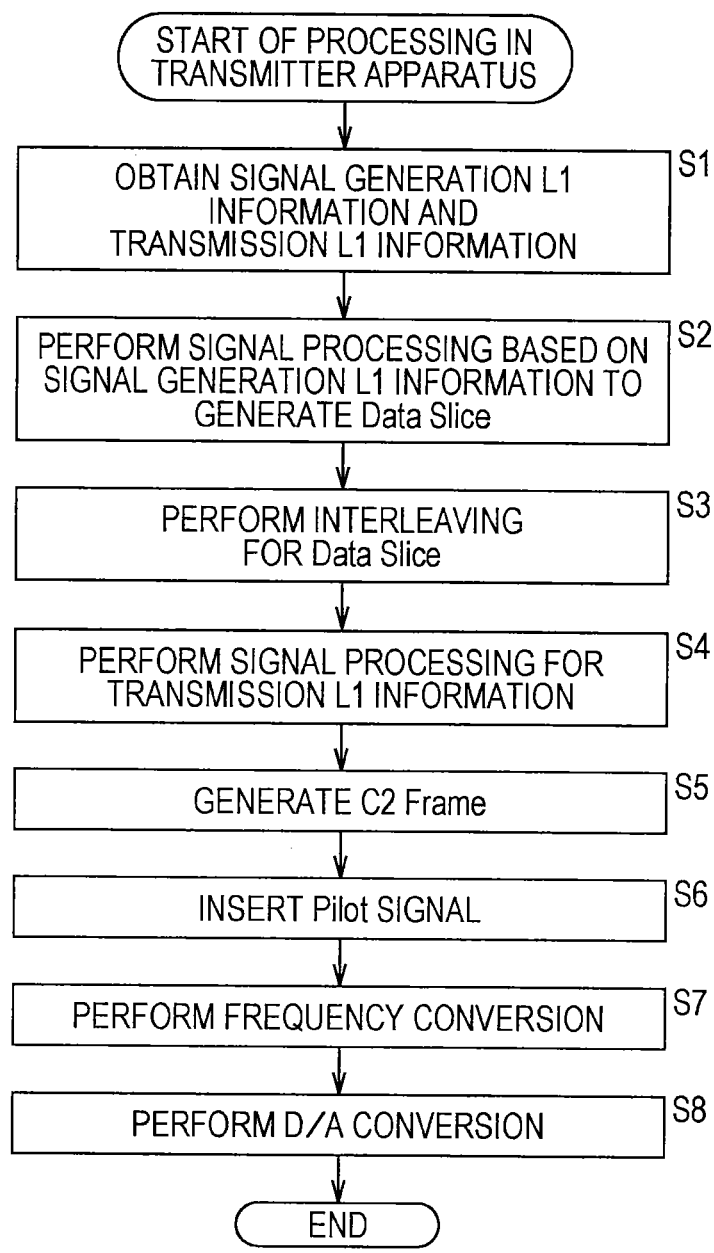
FIG. 14 is a flowchart illustrating a processing in the transmitter apparatus.

Next, a processing in the transmitter apparatus 1A will be described with reference to the flowchart of FIG. 14. Here, it is assumed that the wideband transmission mode is switched on. The processing is similarly applied to the transmitter apparatuses 1B and 1C.

In step S1, the L1 information selecting unit 32 obtains signal generation L1 information input to the input terminal 31A and transmission L1 information input to the input terminal 31B. The L1 information selecting unit 32 outputs the signal generation L1 information to the Data Slice generating units 21-1 to 21-n and the interleaving units 22-1 to 22-n and outputs the transmission L1 information to the error correction coding unit 33.

In step S2, the Data Slice generating units 21-1 to 21-n perform error correction coding, mapping, and the like for the transmission target data based on parameters contained in the signal generation L1 information to generate Data Slices 1 to n.

In step S3, the interleaving units 22-1 to 22-n perform interleaving (time interleaving and frequency interleaving) for the data of Data Slice supplied from each of the Data Slice generating units 21-1 to 21-n. The interleaving units 22-1 to 22-n output the data of Data Slice obtained through the interleaving to the Frame builder unit 38.

In step S4, the error correction coding unit 33 performs error correction coding for the transmission L1 information. In addition, the mapping unit 34 performs mapping of the coded data of the transmission L1 information, and the time interleaving unit 35 performs time interleaving. The L1 block builder unit 36 generates an L1 block including Preamble Symbol, and the frequency interleaving unit 37 performs frequency interleaving of Preamble Symbol.

In step S5, the Frame builder unit 38 adds Preamble Symbol representing the transmission L1 information to Data Symbols of Data Slices 1 to n to generate C2 Frame.

In step S6, the IFFT•GI/pilot insertion unit 41 performs IFFT for C2 Frame to insert a guard interval and a pilot signal. Edge Pilot insertion is controlled such that Edge Pilot is not inserted into at least one of both edges of C2 Frame as described above.

In step S7, the multiplier unit 42 performs frequency conversion of the signal of C2 Frame generated by the IFFT•GI/pilot insertion unit 41.

In step S8, DAC 44 performs D/A conversion for the signal of C2 Frame after the frequency conversion.

DAC 44 outputs the IF signal obtained through the D/A conversion and terminates the process.

Figure 15:
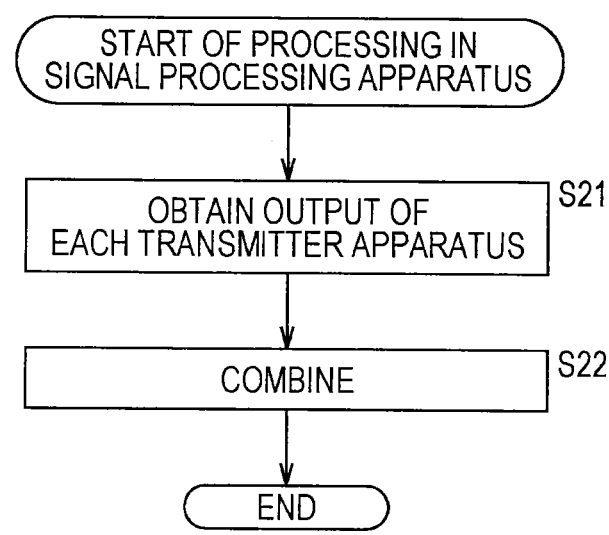
FIG. 15 is a flowchart illustrating a processing in a signal processing apparatus.

Next, a processing in the signal processing apparatus 2 will be described with reference to the flowchart of FIG. 15.

In step S21, the signal processing apparatus 2 obtains the signals of C2 Frame output from the transmitter apparatuses 1A to 1C.

In step S22, the signal processing apparatus 2 combines each signal of C2 Frame into a single of C2 System by arranging each signal of C2 Frame on a frequency basis. The signal of C2 System after the combining is output from the signal processing apparatus 2 and is transmitted to the receiving-side apparatus.

<Specific Example of Combining>

Figure 16:
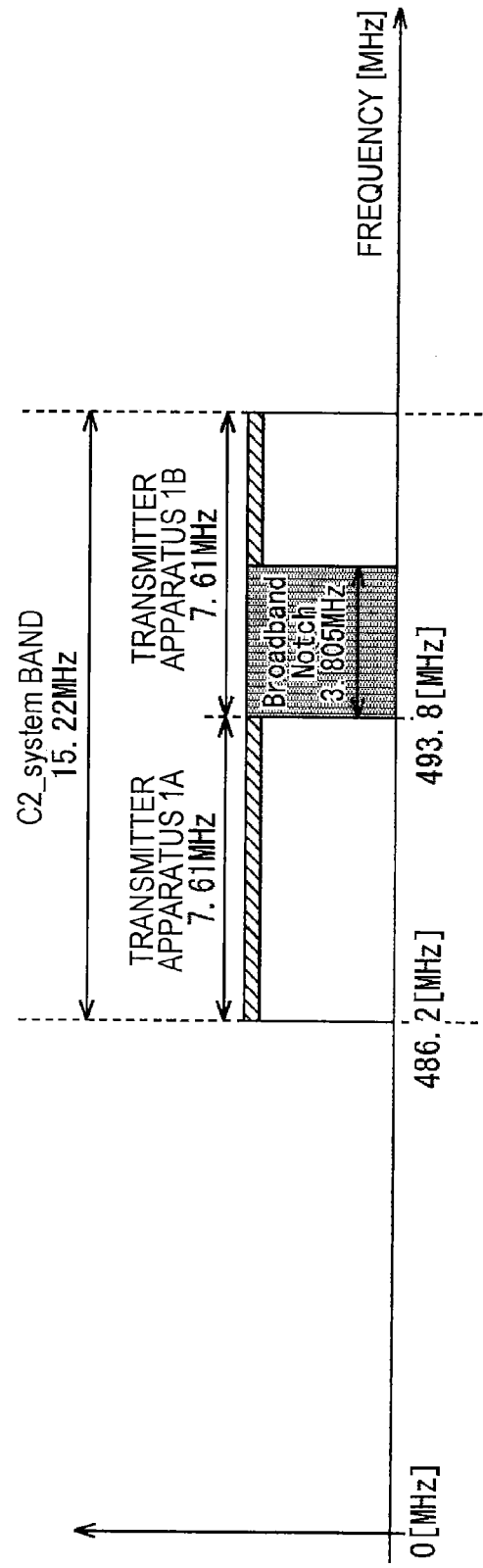
FIG. 16 is a diagram illustrating an example of C2 System after the combining.

FIG. 16 is a diagram illustrating an example of C2 System after combining. Here, a description will be made for a case where the outputs of the transmitter apparatuses 1A and 1B are combined.

Both the bandwidths of the signals of C2 Frame output by the transmitter apparatuses 1A and 1B are set to 7.61 MHz. The bandwidth of C2 System after the combining becomes 15.22 MHz. The start position of the signal of C2 Frame generated by the transmitter apparatus 1A is set to 486.2 MHz, and the start position of the signal including C2 Frame generated by the transmitter apparatus 1B is set to 493.8 MHz. The signal generated by the transmitter apparatus 1B includes Notch (Broadband Notch) having a start position of 493.8 MHz and a bandwidth of 3.805 MHz. Each C2 Frame generated by the transmitter apparatuses 1A and 1B includes a single Data Slice.

FIG. 17 illustrates the signal generation L1 information input to the transmitter apparatus 1A, the signal generation L1 information input to the transmitter apparatus 1B, the transmission L1 information input to the transmitter apparatus 1A, and the transmission L1 information input to the transmitter apparatus 1B in a case where C2 System is generated in this manner.

For example, as indicated in the fourth row of FIG. 17, C2_BANDWIDTH is set to "142d" in the signal generation L1 information input to the transmitter apparatus 1A and the signal generation L1 information input to the transmitter apparatus 1B and is set to "284d" in the transmission L1 information. C2_BANDWIDTH set to "142d" indicates that the signals of C2 Frame output by the transmitter apparatuses 1A and 1B have a bandwidth of 7.61 MHz (=142*24/448 us). C2_BANDWIDTH set to "284d" indicates that C2 System after the combining has a bandwidth of 15.22 MHz (=284*24/448 us).

As indicated in the 8th row, NUM_DSLICE is set to "1" in the signal generation L1 information input to the transmitter apparatus 1A and the signal generation L1 information input to the transmitter apparatus 1B and is set to "2" in the transmission L1 information. NUM_DSLICE set to "1" indicates that the number of Data Slices included in the signal of C2 Frame output by the transmitter apparatuses 1A and 1B is "1". In addition, NUM_DSLICE set to "2" indicates that the number of Data Slices included in C2 System after the combining is "2".

As indicated in the 9th row, NUM_NOTCH is set to "0" in the signal generation L1 information input to the transmitter apparatus 1A and is set to "1" in the signal generation L1 information input to the transmitter apparatus 1B. NUM_NOTCH is also set to "1" in the transmission L1 information. NUM_NOTCH set to "0" indicates that Notch is not included in the signal of C2 Frame output by the transmitter apparatus 1A. In addition, NUM_NOTCH set to "1" indicates that the number of Notches included in C2 System after the combining and the signal output by the transmitter apparatus 1B is "1".

As indicated in the 10th row, DSLICE_ID is set to "0" in the signal generation L1 information input to the transmitter apparatus 1A and the signal generation L1 information input to the transmitter apparatus 1B and is set to "0" and "1" in the transmission L1 information. In the column of transmission L1 information of FIG. 17, the parameters vertically divided into two rows mean that the upper parameter relates to the output of the transmitter apparatus 1A, and the lower parameter relates to the output of the transmitter apparatus 1B.

DSLICE_ID set to "0" and "1" indicates that, in C2 System after the combining, Data Slice included in the signal of C2 Frame output from the transmitter apparatus 1A is identified as "ID_0", and Data Slice included in the signal of C2 Frame output from the transmitter apparatus 1B is identified as "ID_1". Since DSLICE_ID is necessary to be unique within a single C2_system, ID reassignment is performed in the transmission L1 information.

As indicated in the 11th row, DSLICE_TUNE_POS is set to "71d" in the signal generation L1 information input to the transmitter apparatus 1A and is set to "213d" in the signal generation L1 information input to the transmitter apparatus 1B. In the transmission L1 information, DSLICE_TUNE_POS is set to "71d" and "213d". DSLICE_TUNE_POS set to "71d" indicates that a center frequency of Data Slice identified as "ID_0" is set to 490 MHz (=(71*24+352E0h)/448 us). DSLICE_TUNE_POS set to "213d" indicates that a center frequency of Data Slice identified as "ID_1" is set to 497.6 MHz (=(213*24+352E0h)/448 us).

As indicated in the 17th row, DSLICE_LEFT_NOTCH is set to "0" in the signal generation L1 information input to the transmitter apparatus 1A and the signal generation L1 information input to the transmitter apparatus 1B and is set to "0" and "1" in the transmission L1 information. DSLICE_LEFT_NOTCH set to "0" indicates that there is no Notch in the left edge of Data Slice included in the signal of C2 Frame output by the transmitter apparatus 1A and the left edge of Data Slice included in the signal output by the transmitter apparatus 1B. In addition, DSLICE_LEFT_NOTCH set to "0" and "1" indicates that, in C2 System after the combining, there is no Notch in the left edge of Data Slice included in the signal of C2 Frame output from the transmitter apparatus 1A, but there is Notch in the left edge of Data Slice included in the signal of C2 Frame output from the transmitter apparatus 1B.

As indicated in the 30th row, NOTCH_START is set to "invalid data (-)" in the signal generation L1 information input to the transmitter apparatus 1A and is set to "142d" in the signal generation L1 information input to the transmitter apparatus 1B. In the transmission L1 information, NOTCH_START is set to "142d". NOTCH_START set to "142d" indicates that the start position of Notch included in the signal output from the transmitter apparatus 1B is 493.8 MHz (=(142*24+352E0h+1)/448 us), and the start position of Notch is 493.8 MHz also in C2 System after the combining.

As indicated in the 31st row, NOTCH_WIDTH is set to "invalid data" in the signal generation L1 information input to the transmitter apparatus 1A and is set to "71d" in the signal generation L1 information input to the transmitter apparatus 1B. In the transmission L1 information, NOTCH_WIDTH is set to "71d". NOTCH_WIDTH set to "71d" indicates that Notch included in the signal output from the transmitter apparatus 1B has a bandwidth of 3.804 MHz (=(71*24)/448 us or 3.805 MHz in a case where EP is included), and Notch has a bandwidth of 3.804 MHz also in C2 System after the combining.

As indicated in the 32nd row, invalid data is input as a transmission parameter of "Reserve_3" of the signal generation L1 information input to the transmitter apparatus 1A. "Reserve_3" set to invalid data indicates that Notch is not included in the signal of C2 Frame output from the transmitter apparatus 1A.

In a case where L1 information is input as illustrated in FIG. 17, C2 System illustrated in FIG. 16 is output from the signal processing apparatus 2. In addition to the signal generation L1 information, information indicating that Edge Pilot is not inserted into the right edge of Data Symbol, and Edge Pilot is inserted into the left edge may be input to the transmitter apparatus 1A, so that Edge Pilot insertion is controlled by the left-edge EP insertion selecting unit 39 and the right-edge EP insertion selecting unit 40 of the transmitter apparatus 1A. In addition, in addition to the signal generation L1 information, information indicating that Edge Pilot is inserted into the right and left edges of Data Symbol may be input to the transmitter apparatus 1B, so that Edge Pilot insertion is controlled by the left-edge EP insertion selecting unit 39 and the right-edge EP insertion selecting unit 40 of the transmitter apparatus 1B.

[Second Embodiment]

Figure 18:
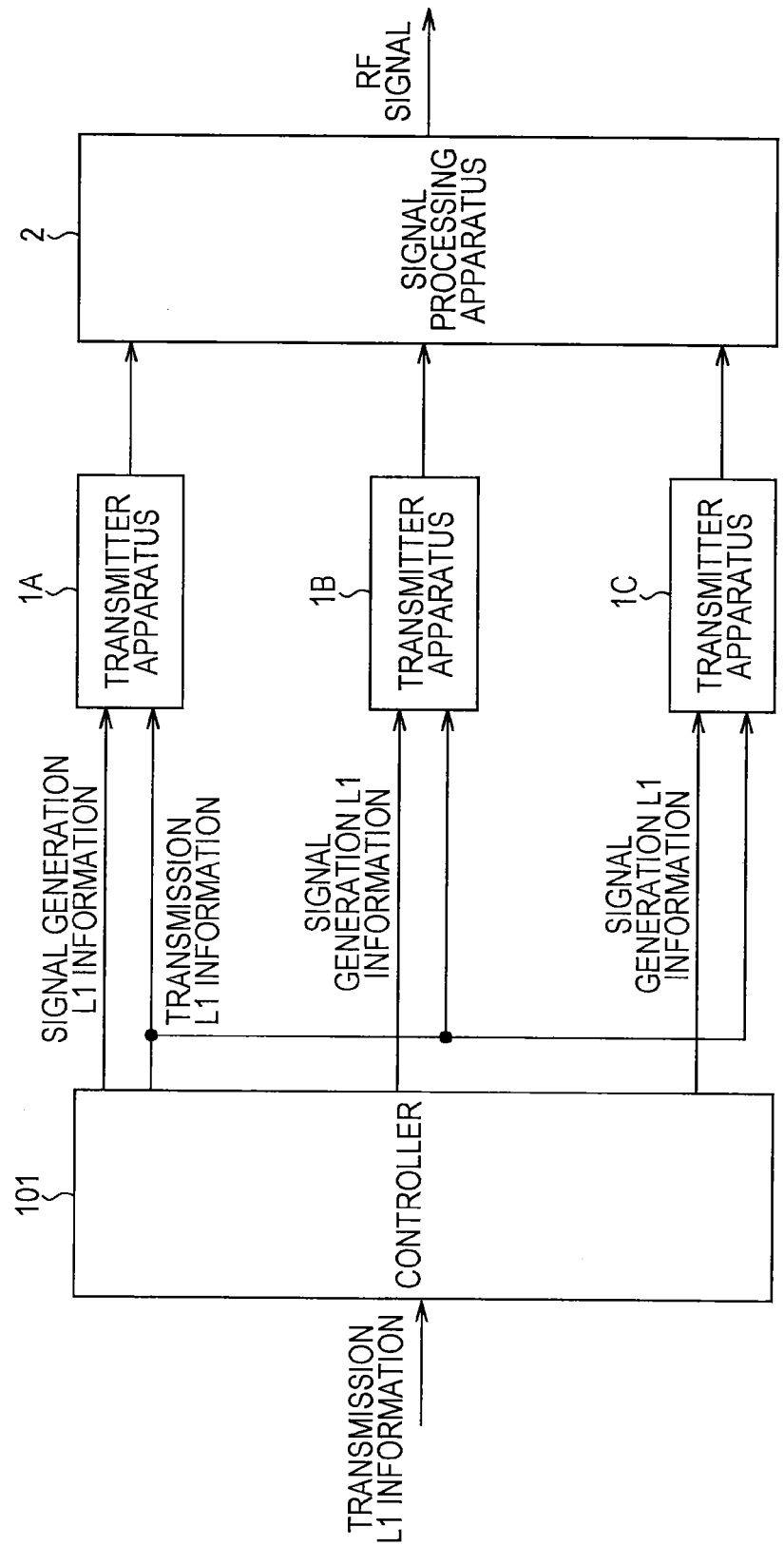
FIG. 18 is a block diagram illustrating another configuration example of the transmitter system.

FIG. 18 is a block diagram illustrating another exemplary configuration of the transmitter system. In the configuration of FIG. 18, like reference numerals denote like elements as in FIG. 9.

The configuration of the transmitter system of FIG. 18 is different from that of FIG. 9 in that a controller 101 is additionally provided. The transmission L1 information is input to the controller 101.

The controller 101 generates each of signal generation L1 information for the transmitter apparatus 1A, signal generation L1 information for the transmitter apparatus 1B, and signal generation L1 information for the transmitter apparatus 1C based on the input transmission L1 information. The controller 101 outputs the transmission L1 information to each of the transmitter apparatuses 1A to 1C. In addition, the controller 101 outputs the signal generation L1 information for the transmitter apparatus 1A, the signal generation L1 information for the transmitter apparatus 1B, and the signal generation L1 information for the transmitter apparatus 1C to the transmitter apparatuses 1A, 1B, and 1C, respectively.

In the transmitter system of FIG. 18, an administrator does not directly input the signal generation L1 information for the transmitter apparatuses 1A to 1C. Instead, the controller 101 generates the signal generation L1 information for the transmitter apparatuses 1A to 1C based on the transmission L1 information and inputs the signal generation L1 information. For example, in a case where C2 System of FIG. 16 is generated, the signal generation L1 information for the transmitter apparatus 1A and the signal generation L1 information for the transmitter apparatus 1B are generated by the controller 101 based on the transmission L1 information of FIG. 17 and are input to the transmitter apparatuses 1A and 1B, respectively.

The transmitter apparatus 1A processes the data input as transmission target data based on the signal generation L1 information supplied from the controller 101 to generate Data Symbol representing the transmission target data. In addition, the transmitter apparatus 1A generates Preamble Symbol representing the transmission L1 information supplied from the controller 101. The transmitter apparatus 1A generates C2 Frame by combining Data Symbol representing the generated transmission target data and Preamble Symbol representing the transmission L1 information and outputs the signal of C2 Frame to the signal processing apparatus 2.

Similarly, the transmitter apparatus 1B processes the data input as transmission target data based on the signal generation L1 information supplied from the controller 101 to generate Data Symbol representing the transmission target data. In addition, the transmitter apparatus 1B generates Preamble Symbol representing the transmission L1 information supplied from the controller 101. The transmitter apparatus 1B generates C2 Frame by combining Data Symbol representing the generated transmission target data and Preamble Symbol representing the transmission L1 information and outputs the signal of C2 Frame to the signal processing apparatus 2.

The transmitter apparatus 1C processes the data input as transmission target data based on the signal generation L1 information supplied from the controller 101 to generate Data Symbol representing the transmission target data. In addition, the transmitter apparatus 1C generates Preamble Symbol representing the transmission L1 information supplied from the controller 101. The transmitter apparatus 1C generates C2 Frame by combining Data Symbol representing the generated transmission target data and Preamble Symbol representing the transmission L1 information and outputs the signal of C2 Frame to the signal processing apparatus 2.

Similar to the signal processing apparatus 2 of FIG. 9, the signal processing apparatus 2 combines the signals of C2 Frame supplied from the transmitter apparatuses 1A to 1C into a single signal of C2 System by arranging the signals of C2 Frame on a frequency basis and outputs the single signal of C2 Frame.

As a result, an administrator of the transmitter system is not necessary to input signal generation L1 information to each transmitter apparatus. It is possible to directly generate a signal by considering a configuration of C2 System to be generated finally and inputting L1 information (transmission L1 information). The controller 101 includes a computer. For example, the transmission L1 information is input when an administrator operates an operation unit provided in the computer.

[Modifications]

<First Modification>

Figure 19:
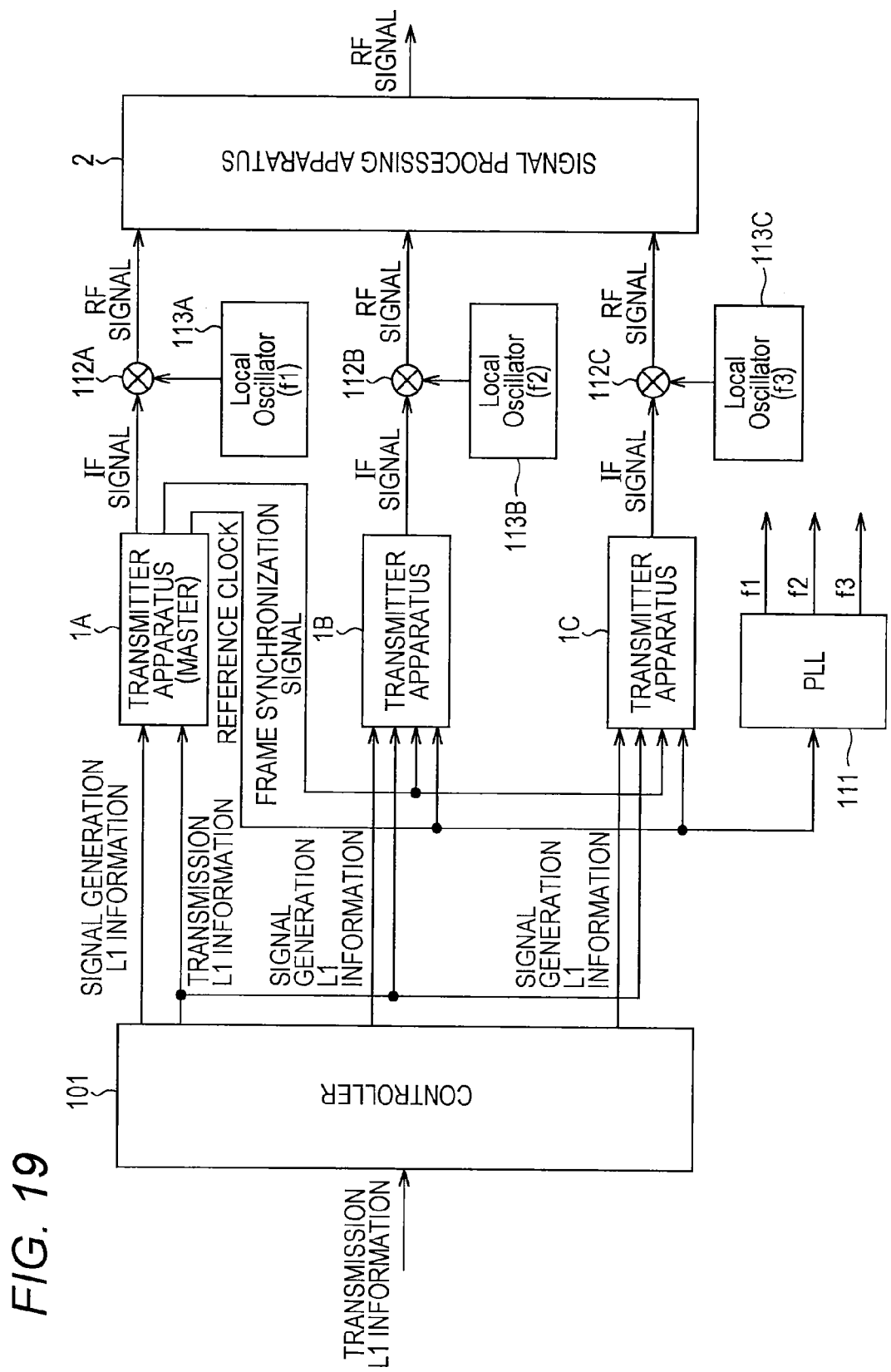
FIG. 19 is a block diagram illustrating still another configuration example of the transmitter system.

FIG. 19 is a block diagram illustrating another configuration example of the transmitter system. In the configuration of FIG. 19, like reference numerals denote like elements as in the configuration of FIG. 18, and a description thereof will not be repeated.

In the transmitter system of FIG. 19, the transmitter apparatuses 1A to 1C are operated based on a reference clock as a common clock signal, and the signal of C2 Frame is output based on a frame synchronization signal as a common synchronization signal.

In this manner, the transmitter apparatuses 1A to 1C are synchronized (in terms of both frequency and time synchronizations) using the common clock signal and the common synchronization signal. Therefore, the receiving-side apparatus can set Receiver Tuning Window (FIG. 3) and receive a signal in synchronization of the outputs of other transmitter apparatuses. In addition, in the transmitter system side, it is possible to prevent Edge Pilot from being inserted into the edge of C2 Frame as described above with reference to FIG. 13 and the like.

The transmitter apparatus 1A of FIG. 19 serves as a master transmitter apparatus to generate and output the reference clock and the frame synchronization signal. The reference clock and the frame synchronization signal output from the transmitter apparatus 1A are input to the transmitter apparatuses 1B and 1C. In addition, the reference clock output from the transmitter apparatus 1A is also input to a phase lock loop (PLL) 111.

The PLL 111 generates clock signals of the frequencies f1, f2, and f3 based on the reference clock supplied from the transmitter apparatus 1A. The clock signal of the frequency f1 generated by the PLL 111 is supplied to Local Oscillator 113A, and the clock signal of the frequency f2 is supplied to Local Oscillator 113B. In addition, the clock signal of the frequency f3 is supplied to Local Oscillator 113C.

A multiplier unit 112A multiplies an IF signal of C2 Frame generated by the transmitter apparatus 1A and a signal of the frequency f1 supplied from Local Oscillator 113A to perform frequency conversion and outputs the signal subjected to frequency conversion to the signal processing apparatus 2.

A multiplier unit 112B multiplies an IF signal of C2 Frame generated by the transmitter apparatus 1B and a signal of the frequency f2 supplied from Local Oscillator 113B to perform frequency conversion and outputs the signal subjected to frequency conversion to the signal processing apparatus 2.

A multiplier unit 112C multiplies an IF signal of C2 Frame generated by the transmitter apparatus 1C and a signal of the frequency f3 supplied from Local Oscillator 113C to perform frequency conversion and outputs the signal subjected to frequency conversion to the signal processing apparatus 2.

Figure 20:
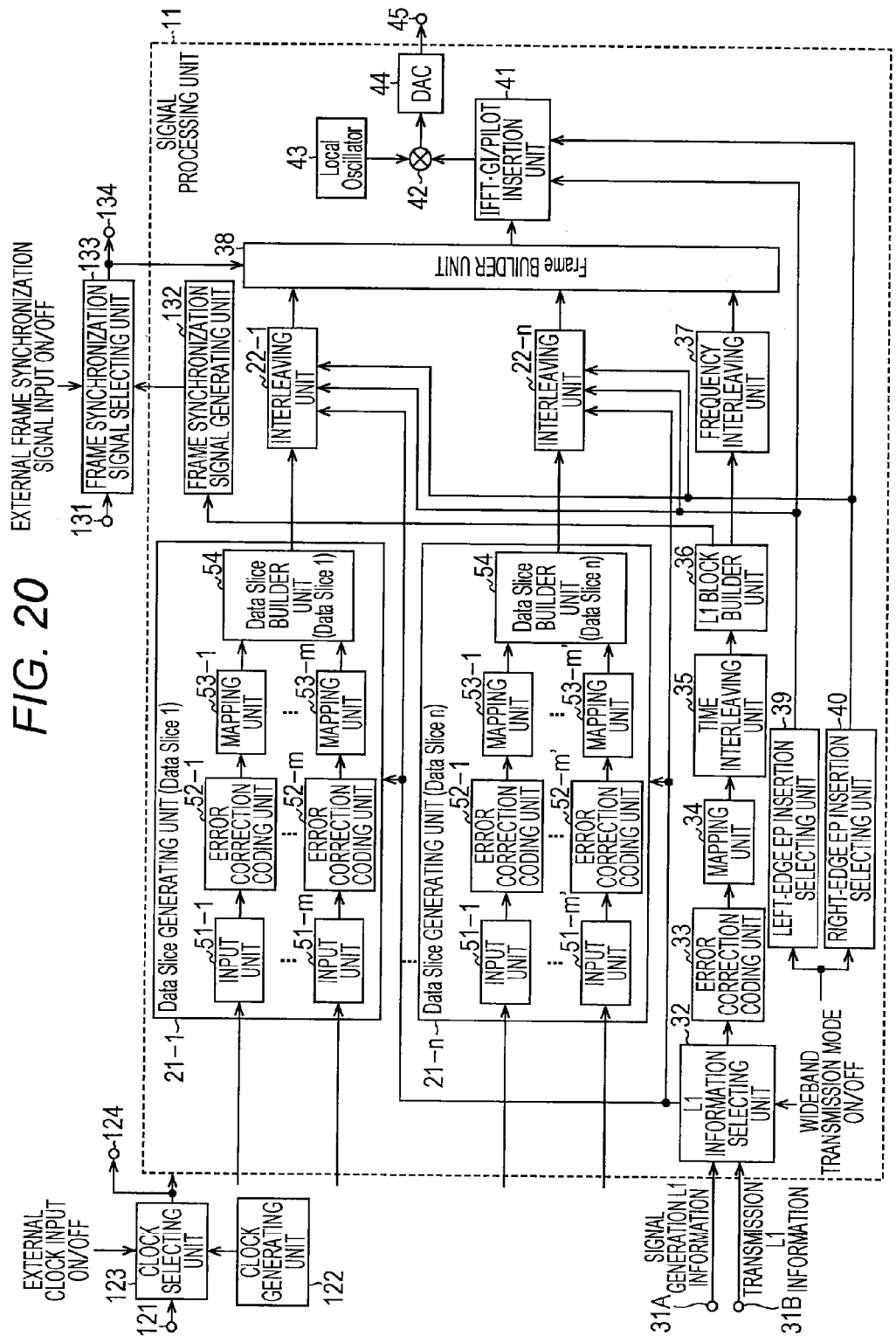
FIG. 20 is a diagram illustrating a configuration example of the transmitter apparatus of FIG. 19.

FIG. 20 is a diagram illustrating a configuration example of the transmitter apparatus 1A of FIG. 19. The configuration of FIG. 20 is also provided in the transmitter apparatuses 1B and 1C of FIG. 19. In the configuration of FIG. 20, like reference numerals denote like elements as in the configuration of FIG. 11, and a description thereof will not be repeated.

The configuration of the signal processing apparatus 11 of FIG. 20 is different from the configuration of FIG. 11 in that a frame synchronization signal generator unit 132 is additionally provided. In the example of FIG. 20, a clock generator unit 122, a clock selecting unit 123, and a frame synchronization signal selecting unit 133 are provided outside the signal processing apparatus 11. Depending on operation of an administrator, information representing switch-on/off of the external clock input is input to the clock selecting unit 123, and information representing switch-on/off of the external frame synchronization signal input is input to the frame synchronization signal selecting unit 133.

The switch-on of the external clock input is selected when the operation is performed based on the external input clock signal. Meanwhile, the switch-off of the external clock input is selected when the operation is performed depending on the internally generated clock signal, and the clock signal is externally output as the reference clock. In the example of FIG. 19, the external clock input is switched off in the transmitter apparatus 1A serving as a master, and the external clock input is switched on in the transmitter apparatuses 1B and 1C.

The switch-on of the external frame synchronization signal input is selected in a case where a signal of C2 Frame is output depending on the externally input frame synchronization signal. Meanwhile, the switch-off of the external frame synchronization signal input is selected in a case where the signal of C2 Frame is output depending on the internally generated frame synchronization signal, and the frame synchronization signal is externally output. In the example of FIG. 19, the external frame synchronization signal input is switched off in the transmitter apparatus 1A serving as a master, and the external frame synchronization signal input is switched on in the transmitter apparatuses 1B and 1C.

The clock generator unit 122 generates a clock signal of a predetermined frequency and outputs the clock signal to the clock selecting unit 123.

In a case where the external clock input is switched on, the clock selecting unit 123 selects the reference clock input to the external clock input terminal 121 and outputs the reference clock. The reference clock selected by the clock selecting unit 123 is supplied to the signal processing apparatus 11 and other transmitter apparatuses (that do not serve as a master) from the reference clock output terminal 124. The operational timing of each unit of the signal processing apparatus 11 is controlled based on the reference clock supplied from the clock selecting unit 123.

In addition, in a case where the external clock input is switched off, the clock selecting unit 123 selects the clock signal generated by the clock generator unit 122 and outputs the clock signal. The clock signal selected by the clock selecting unit 123 is supplied to the signal processing apparatus 11 and is supplied from the reference clock output terminal 124 to other transmitter apparatuses as a reference clock. The operational timing of each unit of the signal processing apparatus 11 is controlled depending on the clock signal supplied from the clock selecting unit 123.

For example, the frame synchronization signal generator unit 132 of the signal processing apparatus 11 monitors the operation of the L1 block builder unit 36 and detects a timing for outputting the L1 block from the L1 block builder unit 36.

The frame synchronization signal generator unit 132 generates a synchronization signal representing the timing for outputting the L1 block from the L1 block builder unit 36 and outputs the synchronization signal as a frame synchronization signal to the frame synchronization signal selecting unit 133.

In a case where the external frame synchronization signal input is switched on, the frame synchronization signal selecting unit 133 selects the frame synchronization signal input to the external frame synchronization signal input terminal 131 and outputs the selected frame synchronization signal. The frame synchronization signal selected by the frame synchronization signal selecting unit 133 is supplied to the Frame builder unit 38 and is also supplied to other transmitter apparatuses (that do not serve as a master) from the frame synchronization signal output terminal 134.

In a case where the external frame synchronization signal input is switched off, the frame synchronization signal selecting unit 133 selects the frame synchronization signal generated by the frame synchronization signal generator unit 132 and outputs the frame synchronization signal. The frame synchronization signal selected by the frame synchronization signal selecting unit 133 is supplied to the Frame builder unit 38 and is supplied to other transmitter apparatuses from the frame synchronization signal output terminal 134. The timing for outputting C2 Frame from the Frame builder unit 38 is controlled depending on the frame synchronization signal supplied from the frame synchronization signal selecting unit 133.

In this manner, synchronization between the transmitter apparatuses 1A to 1C can be applied to the transmitter system of FIG. 9 as well as the transmitter system of FIG. 18.

<Other Modifications>

In the aforementioned description, the signal of C2 Frame is combined by arranging side by side the outputs of each transmitter apparatus on a frequency axis. However, the signal of C2 Frame may be combined by separating a frequency interval. In this case, it is considered that there is Notch in a period having no signal between the signals of C2 Frame output from each transmitter apparatus, and parameters regarding the Notch are described in the transmission L1 information. In a case where the outputs of each transmitter apparatus are overlapped or close to each other, they may interfere with each other. However, if the outputs of each transmitter apparatus are combined with a frequency interval, such a worry can be removed.

A series of processes described above may be implemented by hardware or software. In a case where a series of processes are executed by software, a program including that software is installed in a computer integrated into dedicated hardware, a general personal computer, and the like from a program recording medium.

Figure 21:
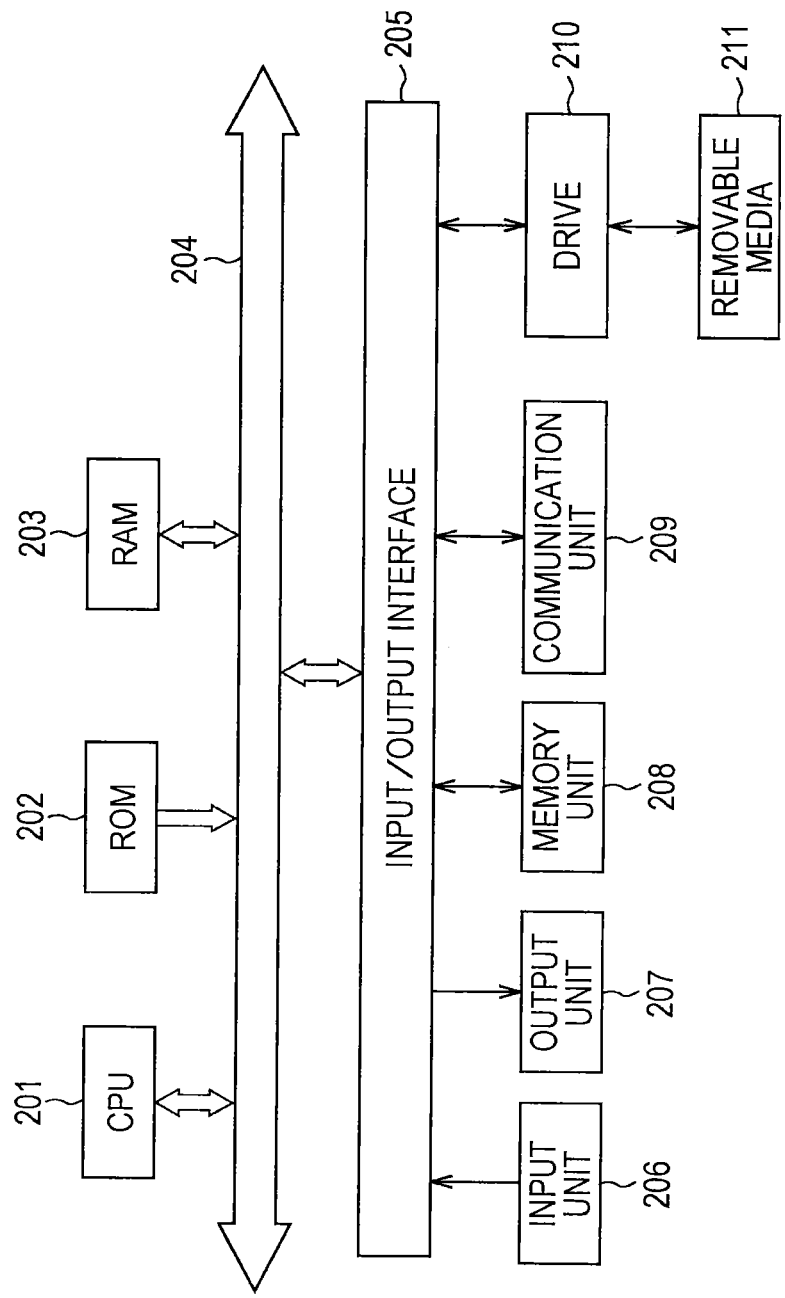
FIG. 21 is a block diagram illustrating a configuration example of a computer.

FIG. 21 is a block diagram illustrating a configuration example of computer hardware executing a program regarding a series of processes described above.

A central processing unit (CPU) 201, a read only memory (ROM) 202, and a random access memory (RAM) 203 are connected to each other via a bus 204.

An input/output (I/O) interface 205 is connected to the bus 204. An input unit 206 such as a keyboard or a mouse and an output unit 207 such as a display or a loudspeaker are connected to the I/O interface 205. In addition, a memory unit 208 such as a hard disc or a non-volatile memory, a communication unit 209 such as a network interface, and a drive 210 for driving a removable media 211 are connected to the I/O interface 205.

In the computer configured as described above, the CPU 201 performs a series of processes described above by loading the program stored in the memory unit 208 on the RAM 203 via the I/O interface 205 and the bus 204 and executing the program.

The program executed by the CPU 201 is recorded, for example, in a removable media 211, is supplied via a wired or wireless transmission media such as a local area network, internet, or a digital broadcasting, and is installed in the memory unit 208.

The program executed by the computer may be a program sequentially processed according to the sequence described herein or a program executed at a necessary timing such as a call.

Embodiments of the present technology are not limited those described above, but may be variously changed without departing from a spirit and scope of the present technology.

The present technology may be embodied as follows.

(1)

A transmitter apparatus including:

a first acquisition unit that obtains first transmission control information;

a second acquisition unit that obtains second transmission control information similar to information input to another transmitter apparatus; and a generating unit that processes transmission target data based on a parameter contained in the first transmission control information and generates data including the processed transmission target data and the second transmission control information.

(2)

The transmitter apparatus according to (1), wherein the data generated by the generating unit are supplied to a signal processing apparatus connected to the transmitter apparatus, and the signal processing apparatus combines the data generated by the generating unit and data generated by the another transmitter apparatus having a configuration similar to that of the transmitter apparatus and outputs the combined data.

(3)

The transmitter apparatus according to (2), wherein the parameter contained in the second transmission control information includes a parameter regarding the combined data.

(4)

The transmitter apparatus according to any one of (1) to (3), wherein the first transmission control information and the second transmission control information are L1 information of DVB-C2, and the generating unit generates C2 Frame including Data Symbol representing the transmission target data and Preamble Symbol representing the second transmission control information.

(5)

The transmitter apparatus according to (4), further including:

a selecting unit that selects whether or not Edge Pilot is inserted, and an insertion unit that controls Edge Pilot insertion for the C2 Frame generated by the generating unit depending on selection of the selecting unit.

(6)

The transmitter apparatus according to (5), wherein, in a case where the C2 Frame generated by the generating unit adjoins another C2 Frame generated by the another transmitter apparatus on a frequency axis, the insertion unit does not insert Edge Pilot into an edge adjoining the another C2 Frame out of both edges of the C2 Frame.

(7)

The transmitter apparatus according to any one of (1) to (6), wherein the first acquisition unit obtains the first transmission control information from a control unit that generates the first transmission control information based on the second transmission control information, and the second acquisition unit obtains the second transmission control information from the control unit.

(8)

The transmitter apparatus according to any one of (1) to (7), wherein the transmitter apparatus and the another transmitter apparatus perform a processing based on a common clock signal.

(9)

The transmitter apparatus according to any one of (1) to (8), wherein the transmitter apparatus and the another transmitter apparatus generate and output the data based on a common synchronization signal.

(10)

An information processing method including:
obtaining first transmission control information;
obtaining second transmission control information similar to information input to another transmitter apparatus;
processing transmission target data based on a parameter contained in the first transmission control information; and
generating data including the processed transmission target data and the second transmission control information.

(11)

A program causing a computer to execute a process including:
obtaining first transmission control information;
obtaining second transmission control information similar to information input to another transmitter apparatus;
processing transmission target data based on a parameter contained in the first transmission control information; and
generating data including the processed transmission target data and the second transmission control information.

(12)

A transmitter system including:
a transmitter apparatus;
another transmitter apparatus; and
a signal processing apparatus connected to the transmitter apparatus and the another transmitter apparatus,
wherein the transmitter apparatus has
a first acquisition unit that obtains first transmission control information,
a second acquisition unit that obtains second transmission control information similar to information input to the another transmitter apparatus, and
a generating unit that processes first transmission target data based on a parameter contained in the first transmission control information and generates first data including the processed first transmission target data and the second transmission control information,
the another transmitter apparatus has
a first acquisition unit that obtains another first transmission control information different from the first transmission control information obtained by the transmitter apparatus,
a second acquisition unit that obtains the second transmission control information similar to information input to the transmitter apparatus, and
a generating unit that processes second transmission target data based on a parameter contained in the another first transmission control information and generates second data including the processed second transmission target data and the second transmission control information, and the signal processing apparatus includes a combining unit that combines the first data generated by the transmitter apparatus and the second data generated by the another transmitter apparatus and outputs the combined data.

REFERENCE SIGNS LIST 1A to 1C Transmitter apparatus, 2 Signal processing apparatus, 101 Controller

The invention claimed is:

1. A transmitter apparatus comprising:
circuitry configured to
obtain first transmission control information;
obtain second transmission control information that is the same information input to another transmitter apparatus,
process transmission target data based on a parameter contained in the first transmission control information, and
generate a data signal including the processed transmission target data and the second transmission control information.

2. The transmitter apparatus according to claim 1, wherein the data generated by the circuitry are supplied to a signal processing apparatus connected to the transmitter apparatus, and
the signal processing apparatus combines the data signal generated by the circuitry and data signal generated by the another transmitter apparatus having a configuration similar to that of the transmitter apparatus and outputs the combined data signal.

3. The transmitter apparatus according to claim 2, wherein the parameter contained in the second transmission control information includes a parameter regarding the combined data signal.

4. The transmitter apparatus according to claim 1, wherein the first transmission control information and the second transmission control information are L1 information of DVB-C2, and
the circuitry generates C2 Frame including Data Symbol representing the transmission target data and Preamble Symbol representing the second transmission control information.

5. The transmitter apparatus according to claim 4, wherein the circuitry is configured to:
select whether or not Edge Pilot is inserted, and
control Edge Pilot insertion for the C2 Frame generated by the circuitry depending on the selection.

6. The transmitter apparatus according to claim 5, wherein, in a case where the C2 Frame generated by the circuitry adjoins another C2 Frame generated by the another transmitter apparatus on a frequency axis, the circuitry does not insert Edge Pilot into an edge adjoining the another C2 Frame out of both edges of the C2 Frame.

7. The transmitter apparatus according to claim 1, wherein the circuitry
obtains the first transmission control information from control circuitry that generates the first transmission control information based on the second transmission control information, and
obtains the second transmission control information from the control circuitry.

8. The transmitter apparatus according to claim 1, wherein the transmitter apparatus and the another transmitter apparatus perform a processing based on a common clock signal.

9. The transmitter apparatus according to claim 1, wherein the transmitter apparatus and the another transmitter apparatus generate and output the data based on a common synchronization signal.

10. An information processing method of a transmitter apparatus, the method comprising:
obtaining first transmission control information;
obtaining second transmission control information similar to information input to another transmitter apparatus;
processing, by circuitry of the transmitter apparatus, transmission target data based on a parameter contained in the first transmission control information; and
generating, by circuitry of the transmitter apparatus, a data signal including the processed transmission target data and the second transmission control information.

11. A non-transitory computer-readable storage medium storing a program which when executed by a computer causes the computer to execute a process comprising:
obtaining first transmission control information;
obtaining second transmission control information similar to information input to another transmitter apparatus;
processing, by the computer, transmission target data based on a parameter contained in the first transmission control information; and
generating, by the computer, a data signal including the processed transmission target data and the second transmission control information.

12. A transmitter system comprising:
a transmitter apparatus;
another transmitter apparatus; and
a signal processing apparatus connected to the transmitter apparatus and the another transmitter apparatus,
wherein the transmitter apparatus includes circuitry configured to
obtain first transmission control information,
obtain second transmission control information similar to information input to the another transmitter apparatus,
process first transmission target data based on a parameter contained in the first transmission control information, and
generate a first data signal including the processed first transmission target data and the second transmission control information,
the another transmitter apparatus includes circuitry configured to
obtain another first transmission control information different from the first transmission control information obtained by the transmitter apparatus,
obtain the second transmission control information similar to information input to the transmitter apparatus,
process second transmission target data based on a parameter contained in the another first transmission control information, and
generate a second data signal including the processed second transmission target data and the second transmission control information, and
the signal processing apparatus includes circuitry configured to combine the first data signal generated by the transmitter apparatus and the second data signal generated by the another transmitter apparatus and output the combined data signal.

13. The transmitter apparatus according to claim 1, wherein the data signal is of a DVB-C2 frame.

14. The information processing method according to claim 10, wherein the data signal is of a DVB-C2 frame.

15. The information processing method according to claim 10, wherein
the first transmission control information and the second transmission control information are L1 information of DVB-C2, and
the step of generating includes generating C2 Frame including Data Symbol representing the transmission target data and Preamble Symbol representing the second transmission control information.

16. The non-transitory computer-readable storage medium according to claim 11, wherein the data signal is of a DVB-C2 frame.

17. The non-transitory computer-readable storage medium according to claim 11, wherein
the first transmission control information and the second transmission control information are L1 information of DVB-C2, and
the step of generating includes generating C2 Frame including Data Symbol representing the transmission target data and Preamble Symbol representing the second transmission control information.

18. The transmitter system according to claim 12, wherein the data signal is of a DVB-C2 frame.

19. The transmitter system according to claim 12, wherein
the first transmission control information and the second transmission control information are L1 information of DVB-C2, and
the circuitry of the transmitter apparatus is configured to generate C2 Frame including Data Symbol representing the transmission target data and Preamble Symbol representing the second transmission control information.

* * * * *